(12) United States Patent
Ghanbarinejad et al.

(10) Patent No.: US 12,382,434 B2
(45) Date of Patent: Aug. 5, 2025

(54) INTEGRATED ACCESS AND BACKHAUL NODE CONFIGURATION

(71) Applicant: LENOVO (BEIJING) LIMITED, Beijing (CN)

(72) Inventors: Majid Ghanbarinejad, Chicago, IL (US); Lianhai Wu, Beijing (CN); Hongmei Liu, Beijing (CN); Joachim Loehr, Wiesbaden (DE)

(73) Assignee: Lenovo (Beijing) Limited, Beijing (CN)

( * ) Notice: Subject to any disclaimer, the term of this patent is extended or adjusted under 35 U.S.C. 154(b) by 385 days.

(21) Appl. No.: 17/917,767

(22) PCT Filed: Apr. 8, 2020

(86) PCT No.: PCT/CN2020/083668
§ 371 (c)(1),
(2) Date: Oct. 7, 2022

(87) PCT Pub. No.: WO2021/203269
PCT Pub. Date: Oct. 14, 2021

(65) Prior Publication Data
US 2023/0171745 A1    Jun. 1, 2023

(51) Int. Cl.
*H04W 72/04*    (2023.01)
*H04W 76/19*    (2018.01)

(52) U.S. Cl.
CPC .......... *H04W 72/04* (2013.01); *H04W 76/19* (2018.02)

(58) Field of Classification Search
CPC .............................. H04W 72/04; H04W 76/19
See application file for complete search history.

(56) References Cited

U.S. PATENT DOCUMENTS

2019/0349079 A1    11/2019    Novlan et al.
2020/0337048 A1*   10/2020    Abedini ............... H04L 1/0009
(Continued)

FOREIGN PATENT DOCUMENTS

CN    110691416 A         1/2020
EP    4044707 A1 *        8/2022    ............ H04W 28/26
(Continued)

OTHER PUBLICATIONS

International Searching Authority, "Written Opinion of the International Searching Authority," PCT/CN2019/083668, Dec. 23, 2020, pp. 1-4.
(Continued)

*Primary Examiner* — Kenny S Lin
(74) *Attorney, Agent, or Firm* — Kunzler Bean & Adamson

(57) ABSTRACT

Apparatuses, methods, and systems are disclosed for integrated access and backhaul node configuration. One method includes receiving, at a first integrated access and backhaul node, a resource configuration corresponding to a second integrated access and backhaul node, wherein the resource configuration comprises information indicating soft resources. The method includes obtaining an activation parameter corresponding to the second integrated access and backhaul node, wherein the activation parameter comprises a first value, a second value, or a combination thereof. The method includes determining whether the activation parameter comprises the first value. The method includes transmitting an availability indication message corresponding to a subset of the soft resources in response to determining that the activation parameter comprises the first value.

13 Claims, 11 Drawing Sheets

(56) References Cited

U.S. PATENT DOCUMENTS

| | | | |
|---|---|---|---|
| 2021/0153189 A1* | 5/2021 | Jo | H04W 72/0453 |
| 2021/0367660 A1* | 11/2021 | Jo | H04B 7/15542 |
| 2021/0368481 A1* | 11/2021 | Jo | H04W 72/21 |
| 2022/0060277 A1* | 2/2022 | Wei | H04L 1/0007 |
| 2022/0078788 A1* | 3/2022 | Tiirola | H04W 72/0446 |
| 2022/0159676 A1* | 5/2022 | Wei | H04W 72/0446 |
| 2022/0174630 A1* | 6/2022 | Wei | H04W 56/0015 |
| 2022/0183003 A1* | 6/2022 | Wei | H04L 5/0092 |

FOREIGN PATENT DOCUMENTS

| | | | | |
|---|---|---|---|---|
| EP | 4096318 A1 * | 11/2022 | | H04B 7/15542 |
| WO | 2020032594 A1 | 2/2020 | | |
| WO | WO-2020091540 A1 * | 5/2020 | | |
| WO | WO-2020100373 A1 * | 5/2020 | | H04W 28/12 |

OTHER PUBLICATIONS

3GPP, Integrated Access and Backhaul for NR, 3GPP RSG RAN meeting #86, RP-193185, Dec. 9-12, 2019, pp. 1-46, Sitges, Spain.

Ericsson, IAB resource configuration and multiplexing, 3GPP TSG-RAN WG1 Meeting #97, R1-1906588, May 13-17, 2019, pp. 1-9, Reno, U.S.

PCT/CN2020/083668, "Supplementary European Search Report", European Patent Office, Nov. 2, 2023, pp. 1-14.

Intel Corporation, "PHY layer enhancements for NR IAB", 3GPP TSG RAN WG1 #95 R1-1812486, Nov. 12-16, 2018, pp. 1-13.

Ericsson, "IAB semi-static configuration for DU resources", 3GPP TSG-RAN WG1 Meeting AH-1901 R1-1900732, Jan. 21-25, 2019, pp. 1-4.

Samsung, "Discussion on NR DC architecture for IAB operation", 3GPP TSG-RAN WG2 Meeting #106 R2-1908029, May 13-17, 2019, pp. 1-2.

Qualcomm, "CR to 38.300 on Integrated Access and Backhaul for NR", 3GPP TSG-RAN WG2 Meeting #108 R2-1916641, Nov. 18-22, 2019, pp. 1-30.

MCC Support, "Draft Report of 3GPP TSG RAN WG1 #99 v0.1.0 (Reno, USA, Nov. 18-22, 2019)", 3GPP TSG RAN WG1 Meeting #100 R1-20xxxxx, Feb. 24-28, 2020, pp. 1-153.

Qualcomm, "New WID on Enhancements to Integrated Access and Backhaul", 3GPP TSG RAN Meeting #86 RP-193251, Dec. 9-12, 2019, pp. 1-5.

3GPP, "3rd Generation Partnership Project; Technical Specification Group Radio Access Network; NR; Backhaul Adaptation Protocol (BAP) specification (Release 16)", 3GPP TS 38.340 V0.4.0, Mar. 2020, pp. 1-21.

3GPP, "3rd Generation Partnership Project; Technical Specification Group Radio Access Network; NR; NR and NG-RAN Overall Description; Stage 2 (Release 16)", 3GPP TS 38.300 V16.1.0, Mar. 2020, pp. 1-133.

* cited by examiner

700

| D/C | PDU Type | R | R | R |

FIG. 7

INTEGRATED ACCESS AND BACKHAUL NODE CONFIGURATION

FIELD

The subject matter disclosed herein relates generally to wireless communications and more particularly relates to integrated access and backhaul node configuration.

BACKGROUND

The following abbreviations are herewith defined, at least some of which are referred to within the following description: Third Generation Partnership Project ("3GPP"), 5G QoS Indicator ("5QI"), Aperiodic CSI ("A-CSI"), Availability Indication ("AI"), Acknowledge Mode ("AM"), Aperiodic ("AP"), IAB-specific Backhaul Adaptation Protocol ("BAP"), Backhaul ("BH"), Broadcast Multicast ("BM"), Buffer Occupancy ("BO"), Base Station ("BS"), Buffer Status Report ("BSR"), Bandwidth ("BW"), Bandwidth Part ("BWP"), Carrier Aggregation ("CA"), Component Carrier ("CC"), Clear Channel Assignment ("CCA"), Common Control Channel ("CCCH"), Control Channel Element ("CCE"), Cell-Defining ("CD"), Code Division Multiplexing ("CDM"), Control Element ("CE"), Core Network ("CN"), Coordinated Multipoint ("CoMP"), Categories of Requirements ("CoR"), Control Resource Set ("CORESET"), Cyclic Prefix ("CP"), Cyclic Prefix OFDM ("CP-OFDM"), Cyclic Redundancy Check ("CRC"), CSI-RS Resource Indicator ("CRI"), Cell RNTI ("C-RNTI"), Channel State Information ("CSI"), CSI IM ("CSI-IM"), CSI RS ("CSI-RS"), Common Search Space ("CSS"), Channel Quality Indicator ("CQI"), Central Unit ("CU"), Codeword ("CW"), Downlink Assignment Index ("DAI"), Dual Connectivity ("DC"), Downlink Control Information ("DCI"), Downlink ("D" or "DL"), Discrete Fourier Transform Spread ("DFTS"), Discrete Fourier Transform Spread OFDM ("DFT-s-OFDM"), Demodulation Reference Signal ("DMRS" or "DM-RS"), Data Radio Bearer ("DRB"), Dedicated Short-Range Communications ("DSRC"), Distributed Unit ("DU"), Enhanced Clear Channel Assessment ("eCCA"), Enhanced Mobile Broadband ("eMBB"), Evolved Node B ("eNB"), Enhanced Subscriber Identification Module ("eSIM"), European Telecommunications Standards Institute ("ETSI"), Enhanced ("E"), Flexible ("F"), Frame Based Equipment ("FBE"), Frequency Division Duplex ("FDD"), Frequency Division Multiple Access ("FDMA"), Frequency Division Orthogonal Cover Code ("FD-OCC"), Frequency Range ("FR"), 450 MHz-6000 MHz ("FR1"), 24250 MHz-52600 MHz ("FR2"), Guard Period ("GP"), Hard ("H"), Hybrid Automatic Repeat Request ("HARQ"), Hybrid Automatic Repeat Request-Acknowledgement ("HARQ-ACK"), High-Definition Multimedia Interface ("HDMI"), Integrated Access and Backhaul ("IAB"), Identity or Identifier or Identification ("ID"), Information Element ("IE"), Interference Measurement ("IM"), International Mobile Subscriber Identity ("IMSI"), Internet-of-Things ("IoT"), Internet Protocol ("IP"), Joint Transmission ("JT"), Level 1 ("L1"), L1 RSRP ("L1-RSRP"), L1 SINR ("L1-SINR"), Licensed Assisted Access ("LAA"), Load Based Equipment ("LBE"), Listen-Before-Talk ("LBT"), Logical Channel ("LCH"), Logical Channel Group ("LCG"), Logical Channel ID ("LCID"), Logical Channel Prioritization ("LCP"), Layer Indicator ("LI"), Long Term Evolution ("LTE"), Levels of Automation ("LoA"), Multiple Access ("MA"), Medium Access Control ("MAC"), Master Cell Group ("MCG"), Modulation and Coding Scheme ("MCS"), Multi DCI ("M-DCI"), Master Information Block ("MIB"), Multiple Input Multiple Output ("MIMO"), Message A ("MsgA"), Message B ("MsgB"), Master Node ("MN"), MsgA PUSCH Occasion ("MPO"), Mobile-Termination ("MT"), Machine Type Communication ("MTC"), Multi PDSCH ("Multi-PDSCH"), Multi TRP ("M-TRP"), Multi-User ("MU"), Multi-User MIMO ("MU-MIMO"), Multi User Shared Access ("MUSA"), Minimum Mean Square Error ("MMSE"), Not Available ("NA"), Negative-Acknowledgment ("NACK") or ("NAK"), Narrowband ("NB"), Next Generation ("NG"), Next Generation Node B ("gNB"), Non-Orthogonal Multiple Access ("NOMA"), New Radio ("NR"), Non-supplementary Uplink ("NUL") (e.g., a "normal" uplink carrier), Non-Zero Power ("NZP"), NZP CSI-RS ("NZP-CSI-RS"), Orthogonal Frequency Division Multiplexing ("OFDM"), Orthogonal Frequency Division Multiple Access ("OFDMA"), Peak-to-Average Power Ratio ("PAPR"), Physical Broadcast Channel ("PBCH"), Physical Downlink Control Channel ("PDCCH"), Physical Downlink Shared Channel ("PDSCH"), PDSCH Configuration ("PDSCH-Config"), Primary Cell ("PCell"), Policy Control Function ("PCF"), Packet Data Convergence Protocol ("PDCP"), Pattern Division Multiple Access ("PDMA"), Packet Data Network ("PDN"), Protocol Data Unit ("PDU"), Physical Hybrid ARQ Indicator Channel ("PHICH"), Power Headroom Report ("PHR"), Public Land Mobile Network ("PLMN"), Precoding Matrix Indicator ("PMI"), ProSe Per Packet Priority ("PPPP"), ProSe Per Packet Reliability ("PPPR"), Physical Random Access Channel ("PRACH"), Physical Resource Block ("PRB"), Packet Switched ("PS"), Physical Sidelink Control Channel ("PSCCH"), Physical Sidelink Shared Channel ("PSSCH"), Phase Tracking RS ("PTRS" or "PT-RS"), Physical Uplink Control Channel ("PUCCH"), Physical Uplink Shared Channel ("PUSCH"), QoS Class Indicator ("QCI"), Quasi Co-Located ("QCL"), Quality of Service ("QoS"), Quadrature Phase Shift Keying ("QPSK"), Random Access Procedure ("RACH"), Radio Access Network ("RAN"), Random Access Response ("RAR"), Radio Access Technology ("RAT"), Resource Element ("RE"), Radio Frequency ("RF"), Rank Indicator ("RI"), Radio Link Control ("RLC"), Radio Link Failure ("RLF"), Remaining Minimum System Information ("RMSI"), Radio Network Temporary Identifier ("RNTI"), Resource Pool ("RP"), Radio Resource Control ("RRC"), Remote Radio Head ("RRH"), Radio Resource Management ("RRM"), Reference Signal ("RS"), Resource Spread Multiple Access ("RSMA"), Reference Signal Received Power ("RSRP"), Reference Signal Received Quality ("RSRQ"), Round Trip Time ("RTT"), Receive ("RX"), Soft ("S"), Single Carrier Frequency Division Multiple Access ("SC-FDMA"), Single Carrier Frequency Domain Spread Spectrum ("SC-FDSS"), Secondary Cell ("SCell"), Shared Channel ("SCH"), Secondary Cell Group ("SCG"), Sub Carrier Spacing ("SCS"), Sparse Code Multiple Access ("SCMA"), Single DCI ("S-DCI"), Spatial Division Multiplexing ("SDM"), Service Data Unit ("SDU"), Single Frequency Network ("SFN"), System Information Block ("SIB"), Subscriber Identity Module ("SIM"), Signal-to-Interference-Plus-Noise Ratio ("SINR"), Sidelink ("SL"), Secondary Node ("SN"), Semi Persistent ("SP"), Special Cell ("SpCell") (e.g., a PCell of a MCG or SCG), SP CSI ("SP-CSI"), Scheduling Request ("SR"), SRS Resource Indicator ("SRI"), Sounding Reference Signal ("SRS"), Synchronization Signal ("SS"), Synchronization Signal/Physical Broadcast Channel ("SS/PBCH"), SS/PBCH Block ("SSB"), Supplementary Uplink ("SUL"), Transport Block ("TB"), Transport Block Size ("TBS"), Transmission Configuration Indicator ("TCI"), Temporary Cell RNTI ("TC-RNTI"), Time Division Duplex ("TDD"), Time Division Multiplex ("TDM"), Time Division Orthogonal Cover Code ("TD-OCC"), Temporary Mobile Subscriber Identity ("TMSI"), Transmitted Precoding Matrix Indicator ("TPMI"), Transmission Reception Point ("TRP"), Technical Standard ("TS"), Transmission Time Interval ("TTI"), Transmit ("TX"), Uplink Control Information ("UCI"), User Entity/Equipment (Mobile Terminal) ("UE"), Universal Integrated Circuit Card ("UICC"), Uplink ("U" or "UL"), Unacknowledged Mode ("UM"), Universal Mobile Telecommunications System ("UMTS"), LTE Radio Interface ("Uu interface"), User Plane ("UP"), Ultra-Reliable Low-Latency Communication ("URLLC"), Universal Subscriber Identity Module ("USIM"), UE-specific Search Space ("USS"), Universal Terrestrial Radio Access Network ("UTRAN"), Vehicle to Everything ("V2X"), Voice Over IP ("VoIP"), Visited Public Land Mobile Network ("VPLMN"), Vehicle RNTI ("V-RNTI"), Worldwide Interoperability for Microwave Access ("WiMAX"), Zero Forcing ("ZF"), Zero Power ("ZP"), and ZP CSI-RS ("ZP-CSI-RS"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, integrated access and backhaul nodes may be used.

BRIEF SUMMARY

Methods for integrated access and backhaul node configuration are disclosed. Apparatuses and systems also perform the functions of the methods. In one embodiment, the method includes receiving, at a first integrated access and backhaul node, a resource configuration corresponding to a second integrated access and backhaul node, wherein the resource configuration comprises information indicating soft resources. In certain embodiments, the method includes obtaining an activation parameter corresponding to the second integrated access and backhaul node, wherein the activation parameter comprises a first value, a second value, or a combination thereof. In some embodiments, the method includes determining whether the activation parameter comprises the first value. In various embodiments, the method includes transmitting an availability indication message corresponding to a subset of the soft resources in response to determining that the activation parameter comprises the first value.

An apparatus for integrated access and backhaul node configuration, in one embodiment, includes a receiver that receives, at a first integrated access and backhaul node, a resource configuration corresponding to a second integrated access and backhaul node, wherein the resource configuration comprises information indicating soft resources. In some embodiments, the apparatus includes a processor that: obtains an activation parameter corresponding to the second integrated access and backhaul node, wherein the activation parameter comprises a first value, a second value, or a combination thereof; and determines whether the activation parameter comprises the first value. In certain embodiments, the apparatus includes a transmitter that transmits an availability indication message corresponding to a subset of the soft resources in response to determining that the activation parameter comprises the first value.

A further method for integrated access and backhaul node configuration includes receiving, at a first integrated access and backhaul node, a resource configuration, wherein the resource configuration comprises information indicating soft resources. In certain embodiments, the method includes receiving an availability indication message corresponding to a subset of the soft resources. In some embodiments, the method includes determining whether the availability indication message is valid. In various embodiments, the method includes using the subset of the soft resources in response to determining that the availability indication message is valid.

A further apparatus for integrated access and backhaul node configuration, in one embodiment, includes a receiver that: receives, at a first integrated access and backhaul node, a resource configuration, wherein the resource configuration comprises information indicating soft resources; and receives an availability indication message corresponding to a subset of the soft resources. In some embodiments, the apparatus includes a processor that: determines whether the availability indication message is valid; and uses the subset of the soft resources in response to determining that the availability indication message is valid.

A method for integrated access and backhaul node configuration includes receiving, at an integrated access and backhaul donor, first information indicating a first link between a first integrated access and backhaul node and a second integrated access and backhaul node. In certain embodiments, the method includes receiving second information indicating a second link between the first integrated access and backhaul node and a third integrated access and backhaul node. In some embodiments, the method includes transmitting a resource configuration to the first integrated access and backhaul node, wherein the resource configuration comprises third information indicating soft resources. In various embodiments, the method includes transmitting a first activation parameter to the second integrated access and backhaul node corresponding to the first link.

An apparatus for integrated access and backhaul node configuration, in one embodiment, includes a receiver that: receives, at an integrated access and backhaul donor, first information indicating a first link between a first integrated access and backhaul node and a second integrated access and backhaul node; and receives second information indicating a second link between the first integrated access and backhaul node and a third integrated access and backhaul node. In various embodiments, the apparatus includes a transmitter that: transmits a resource configuration to the first integrated access and backhaul node, wherein the resource configuration comprises third information indicating soft resources; and transmits a first activation parameter to the second integrated access and backhaul node corresponding to the first link.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 7 is a schematic block diagram illustrating one embodiment of a BAP control PDU format;

DETAILED DESCRIPTION

Figure 1:
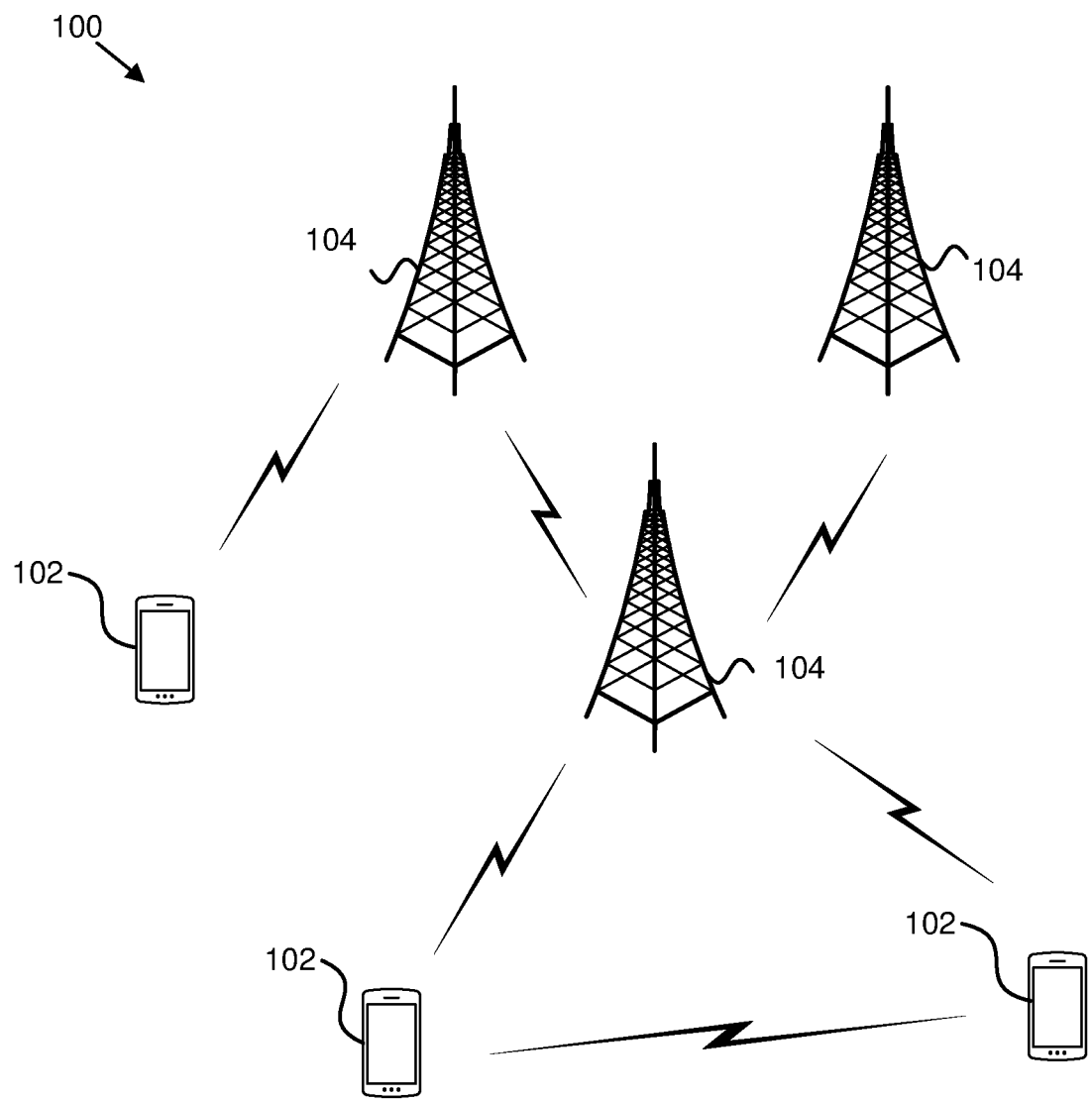
FIG. 1 is a schematic block diagram illustrating one embodiment of a wireless communication system for integrated access and backhaul node configuration.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices.

Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for integrated access and backhaul node configuration. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals and/or the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a customer-premises equipment, a RAN, a relay node, a device, a network device, an IAB node, a donor IAB node, an IAB donor, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 5G or NG (Next Generation) standard of the 3GPP protocol, wherein the network unit 104 transmits using NG RAN technology. More generally, however, the wireless communication system 100 may implement some other open or proprietary communication protocol, for example, LTE, LTE-Advanced, Wi-Fi, or WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain. Furthermore, the network units 104 may communicate directly with other network units 104 via sidelink communication.

In some embodiments, a remote unit 102 and/or a network unit 104 may receive, at a first integrated access and backhaul node, a resource configuration corresponding to a second integrated access and backhaul node, wherein the resource configuration comprises information indicating soft resources. In certain embodiments, the remote unit 102 and/or the network unit 104 may obtain an activation parameter corresponding to the second integrated access and backhaul node, wherein the activation parameter comprises a first value, a second value, or a combination thereof. In some embodiments, the remote unit 102 and/or the network unit 104 may determine whether the activation parameter comprises the first value. In various embodiments, the remote unit 102 and/or the network unit 104 may transmit an availability indication message corresponding to a subset of the soft resources in response to determining that the activation parameter comprises the first value. Accordingly, a remote unit 102 and/or a network unit 104 may be used for integrated access and backhaul node configuration.

In certain embodiments, a remote unit 102 and/or a network unit 104 may receive, at a first integrated access and backhaul node, a resource configuration, wherein the resource configuration comprises information indicating soft resources. In certain embodiments, the remote unit 102 and/or the network unit 104 may receive an availability indication message corresponding to a subset of the soft resources. In some embodiments, the remote unit 102 and/or the network unit 104 may determine whether the availability indication message is valid. In various embodiments, the remote unit 102 and/or the network unit 104 may use the subset of the soft resources in response to determining that the availability indication message is valid. Accordingly, a remote unit 102 and/or a network unit 104 may be used for integrated access and backhaul node configuration.

In various embodiments, a remote unit 102 and/or a network unit 104 may receive, at an integrated access and backhaul donor, first information indicating a first link between a first integrated access and backhaul node and a second integrated access and backhaul node. In certain embodiments, the remote unit 102 and/or the network unit 104 may receive second information indicating a second link between the first integrated access and backhaul node and a third integrated access and backhaul node. In some embodiments, the remote unit 102 and/or the network unit 104 may transmit a resource configuration to the first integrated access and backhaul node, wherein the resource configuration comprises third information indicating soft resources. In various embodiments, the remote unit 102 and/or the network unit 104 may transmit a first activation parameter to the second integrated access and backhaul node corresponding to the first link. Accordingly, a remote unit 102 and/or a network unit 104 may be used for integrated access and backhaul node configuration.

Figure 2:
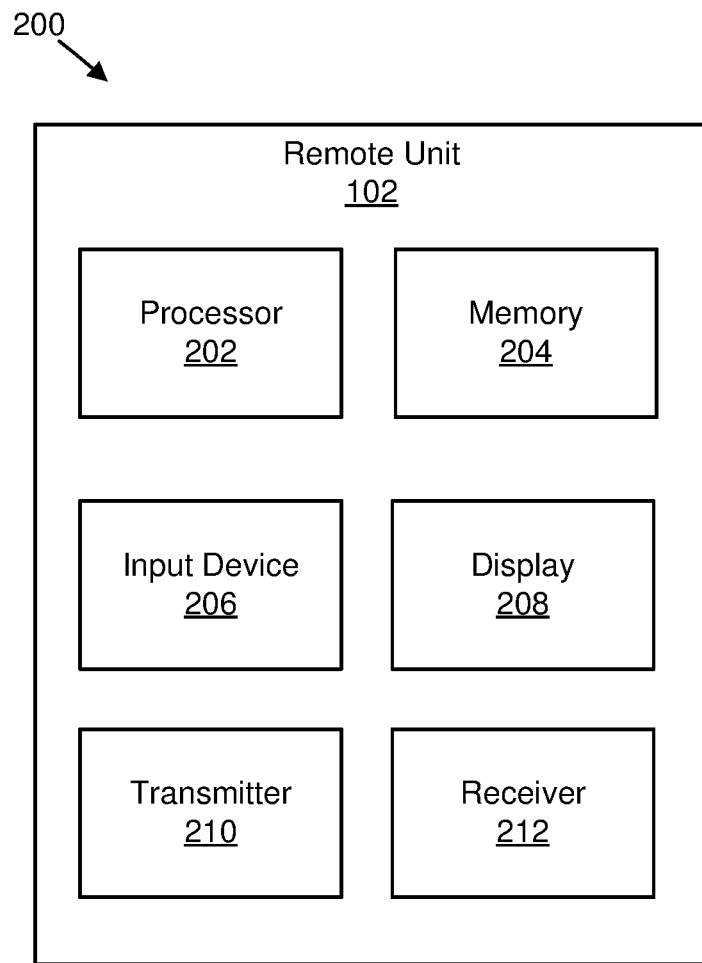
FIG. 2 is a schematic block diagram illustrating one embodiment of an apparatus that may be used for integrated access and backhaul node configuration.

FIG. 2 depicts one embodiment of an apparatus 200 that may be used for integrated access and backhaul node configuration. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In various embodiments, the receiver 212 may receive, at a first integrated access and backhaul node, a resource configuration corresponding to a second integrated access and backhaul node, wherein the resource configuration comprises information indicating soft resources. In some embodiments, the processor 202 may: obtain an activation parameter corresponding to the second integrated access and backhaul node, wherein the activation parameter comprises a first value, a second value, or a combination thereof; and determine whether the activation parameter comprises the first value. In certain embodiments, the transmitter 210 may transmit an availability indication message corresponding to a subset of the soft resources in response to determining that the activation parameter comprises the first value.

In one embodiment, the receiver 212: receives, at a first integrated access and backhaul node, a resource configuration, wherein the resource configuration comprises information indicating soft resources; and receives an availability indication message corresponding to a subset of the soft resources. In some embodiments, the processor 202: determines whether the availability indication message is valid; and uses the subset of the soft resources in response to determining that the availability indication message is valid.

In certain embodiments, the receiver 212: receives, at an integrated access and backhaul donor, first information indicating a first link between a first integrated access and backhaul node and a second integrated access and backhaul node; and receives second information indicating a second link between the first integrated access and backhaul node and a third integrated access and backhaul node. In various embodiments, the transmitter 210: transmits a resource configuration to the first integrated access and backhaul node, wherein the resource configuration comprises third information indicating soft resources; and transmits a first activation parameter to the second integrated access and backhaul node corresponding to the first link.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
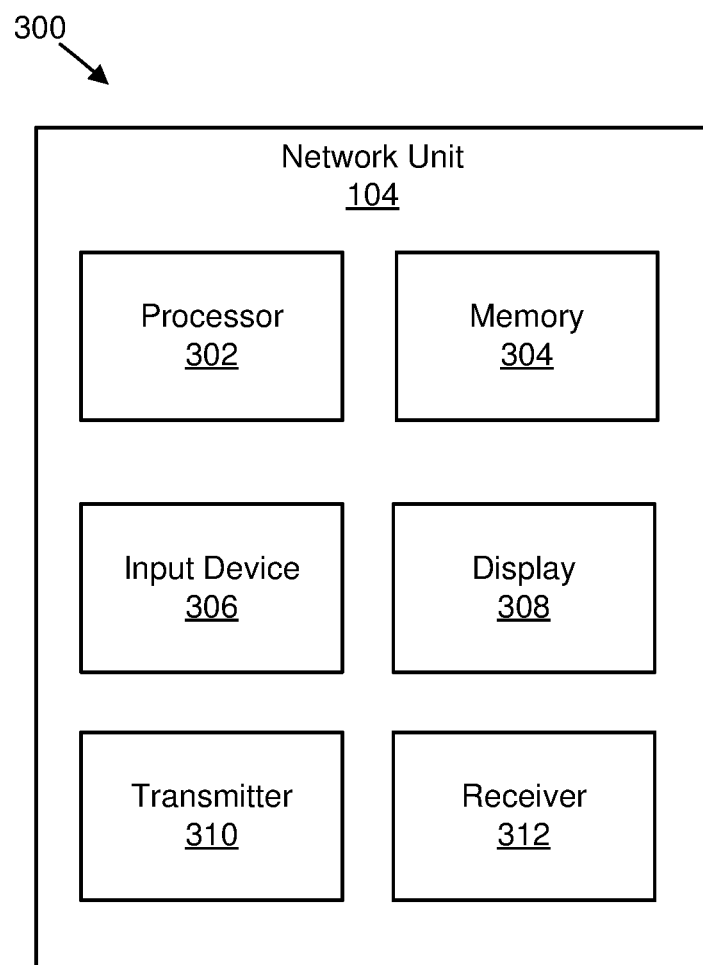
FIG. 3 is a schematic block diagram illustrating one embodiment of an apparatus that may be used for integrated access and backhaul node configuration.

FIG. 3 depicts one embodiment of an apparatus 300 that may be used for integrated access and backhaul node configuration. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the receiver 312 may receive, at a first integrated access and backhaul node, a resource configuration corresponding to a second integrated access and backhaul node, wherein the resource configuration comprises information indicating soft resources. In some embodiments, the processor 302 may: obtain an activation parameter corresponding to the second integrated access and backhaul node, wherein the activation parameter comprises a first value, a second value, or a combination thereof; and determine whether the activation parameter comprises the first value. In certain embodiments, the transmitter 310 may transmit an availability indication message corresponding to a subset of the soft resources in response to determining that the activation parameter comprises the first value.

In one embodiment, the receiver 312: receives, at a first integrated access and backhaul node, a resource configuration, wherein the resource configuration comprises information indicating soft resources; and receives an availability indication message corresponding to a subset of the soft resources. In some embodiments, the processor 302: determines whether the availability indication message is valid; and uses the subset of the soft resources in response to determining that the availability indication message is valid.

In certain embodiments, the receiver 312: receives, at an integrated access and backhaul donor, first information indicating a first link between a first integrated access and backhaul node and a second integrated access and backhaul node; and receives second information indicating a second link between the first integrated access and backhaul node and a third integrated access and backhaul node. In various embodiments, the transmitter 310: transmits a resource configuration to the first integrated access and backhaul node, wherein the resource configuration comprises third information indicating soft resources; and transmits a first activation parameter to the second integrated access and backhaul node corresponding to the first link.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4A:
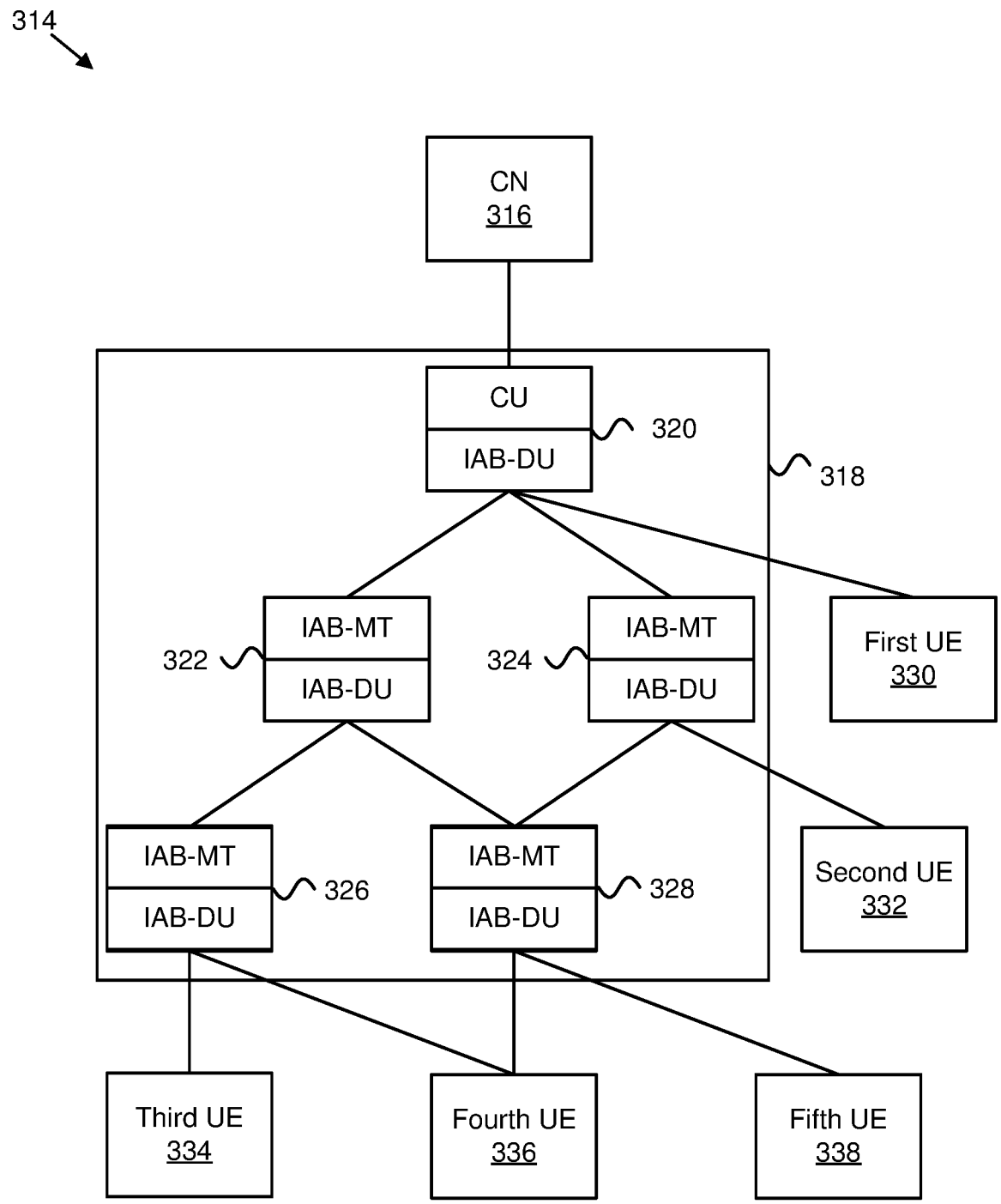
FIG. 4A is a schematic block diagram illustrating one embodiment of a system having an IAB system.

FIG. 4A is a schematic block diagram illustrating one embodiment of a system 314 having an IAB system. The system 314 includes a CN 316 and an IAB system 318 connected to the CN 316. The IAB system 318 includes an IAB donor 320 (e.g., gNB) that includes a CU in communication with an IAB-DU. The IAB system 318 also includes a first IAB node 322 (e.g., IAB-MT/IAB-DU), a second IAB node 324 (e.g., IAB-MT/IAB-DU), a third IAB node 326 (e.g., IAB-MT/IAB-DU), and a fourth IAB node 328 (e.g., IAB-MT/IAB-DU). As may be appreciated, the IAB system 318 may include any suitable number of IAB nodes. The system 314 also includes a first UE 330, a second UE 332, a third UE 334, a fourth UE 336, and a fifth UE 338. It should be noted that the system 314 may include any suitable number of UEs. In some embodiments, an IAB-MT may be similar to and/or include the remote unit 102, and the IAB-DU may be similar to and/or include the network unit 104. Moreover, within a node, the IAB-MT and the IAB-DU may be internally connected. As used herein, the following may be used interchangeably: an IAB-MT of a child node, an IAB-MT of a node, and/or a child IAB-MT. Moreover, as used herein, the following may be used interchangeably: an IAB-DU of a parent node, an IAB-DU of a node, and/or a parent IAB-DU. Furthermore, any use of a parent IAB node (e.g., or an IAB-DU of an IAB node) herein may also be applicable to an IAB donor (e.g., or an IAB-DU of an IAB donor).

In certain embodiments, an IAB node may receive resource configurations in which each symbol in a slot may be downlink ("D"), uplink ("U"), or flexible (F). In such embodiments, a flexible symbol may be used in downlink or uplink communications. In various embodiments, an IAB node may receive configurations that indicate whether each symbol in a slot is hard ("H"), soft ("S"), or not available ("NA"). In such embodiments, a hard symbol may be always available, an NA symbol may not be available, and a soft symbol's availability for scheduling may be subject to an availability indication ("AI") from a parent node. In some embodiments, indications of hard and soft symbols in a configuration may be explicit, while symbols not indicated hard or soft may be indicated not available implicitly. As used herein, a parent node may be a first network unit 104 that provides a serving cell for a second network unit 104. Accordingly, the second network unit 104 may be called a child node of the first network unit 104. Moreover, as used in FIG. 4A, the IAB donor 320 may be a parent of the first IAB node 322 and the second IAB node 324 (e.g., an IAB donor being a parent). Furthermore, as used in FIG. 4A, the first IAB node 322 may be a parent of the third IAB node 326 and the fourth IAB node 328 (e.g., an IAB node being a parent). In addition, as used in FIG. 4A, the first IAB node 322 and the second IAB node 324 may be child nodes of the IAB donor 320. Moreover, as used in FIG. 4A, the third IAB node 326 and the fourth IAB node 328 may be child nodes of the first IAB node 322.

In some embodiments, a DCI format (e.g., DCI format 2_5) may be used to indicate availability of soft resources for an IAB node. In such embodiments, a granularity of the soft resources may be per child node per resource type (e.g., D/U/F—soft resources of a type D/U/F may be indicated either as all available or as all not available for a particular instance). Therefore, in such embodiments, an availability indication may be interpreted in connection with resource configurations that are received by the IAB node in advance. As may be appreciated, a child node may be a node that has its IAB-MT connected to a parent node's IAB-DU. Accordingly, the parent (e.g., IAB-DU) provides a serving cell to the child (e.g., IAB-MT).

In certain embodiments, a parent node may indicate an availability of soft resources for a child node in coordination with resources that the parent node may use for its own communications, the resources that are indicated available for other child nodes, and so forth. Therefore, in such embodiments, the parent node may be fully aware of the child node's interpretation of AI (e.g., found in DCI format 2_5).

In some embodiments, if dual connectivity is used and if an IAB node's parents do not have a common understanding of resource configurations for the IAB node, AI from a parent node may not be interpreted correctly by the IAB node, which may result in collisions.

In various embodiments, if dual connectivity is used and if an IAB node receives AI from more than one parent node (e.g., the AI from the multiple parent nodes are fully consistent), the IAB node's interpretation and behavior may be defined.

In certain embodiments, if dual connectivity is used and if an IAB node receives AI from a parent node and schedules communications with a child node, but the link to the parent node fails before the communications occur, the scheduling may or may not be valid.

Figure 4B:
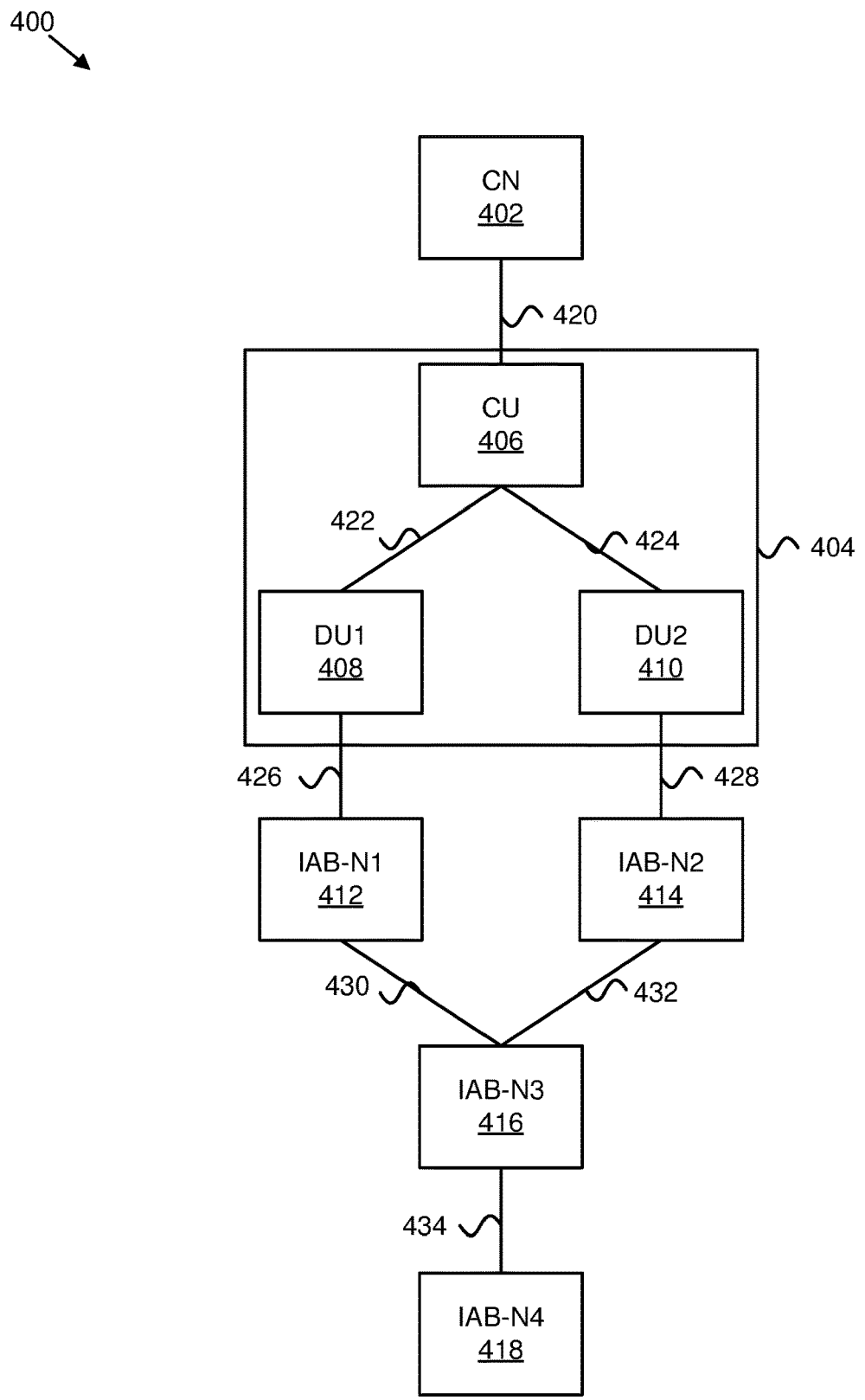
FIG. 4B is a schematic block diagram illustrating one embodiment of DC in a system.

FIG. 4B is a schematic block diagram illustrating one embodiment of DC in a system 400. The system 400 includes a CN 402 and an IAB system connected to the CN 402 via an IAB donor 404 (e.g., gNB). The IAB donor 404 includes a CU 406, a DU DU1 408, and a DU DU2 410. The system 400 also includes an IAB-N1 412 (e.g., parent node), an IAB-N2 414 (e.g., parent node), an IAB-N3 416 (e.g., child node and parent node), and an IAB-N4 418 (e.g., child node).

The CN 402 communicates with the CU 406 via a first communication interface 420, the CU 406 communicates with the DU1 408 via a second communication interface 422, the CU 406 communicates with the DU2 410 via a third communication interface 424, the DU1 408 communicates with the IAB-N1 412 via a fourth communication interface 426, the DU2 410 communicates with the IAB-N2 414 via a fifth communication interface 428, the IAB-N1 412 communicates with the IAB-N3 416 via a sixth communication interface 430 (e.g., MCG link), the IAB-N2 414 communicates with the IAB-N3 416 via a seventh communication interface 432 (e.g., SCG link), and the IAB-N3 416 communicates with the IAB-N4 418 via an eighth communication interface 434 (e.g., NR Uu interface). Each of interfaces 426 and 428 may include a multi-hop route in which each hop includes a link between two network units 104 that are not shown in FIG. 4B.

In FIG. 4B, the parent nodes IAB-N1 412 and IAB-N2 414 may be informed by the CU 406 of the IAB-N3's 416 resource configurations. However, the parent nodes IAB-N1 412 and IAB-N2 414 may not know which one is allowed to transmit a particular DCI format (e.g., DCI format 2_5) to the IAB-N3 416. It may also not be known how to handle resources indicated by DCI if a link associated with the DCI transmission fails. In some embodiments, a MAC CE message and/or a BAP control PDU may be used for a signaling to enable a parent node to provide an availability indication through DCI. In various embodiments, it should be noted that a parent node may be able to send AI to a child node without knowing configuration information of the child node. For example, if a parent node provides full availability for all resources in a slot to a child node, the parent node can do so without knowing which resources are soft.

In certain embodiments, an IAB node may receive AI from a master node. In such embodiments, the AI may include AvailabilityCombinations that may have a similar structure to SlotFormatCombinations. The availability indicators may be applicable to several slots, but a timing for the validity of the AI in a DC configuration may be unknown.

In one example, an IAB node, such as IAB-N3 416, may receive AI from a master node, such as IAB-N1 412, for several slots in advance. Based on the received AI, the IAB node may schedule communications on those slots with its own child nodes, such as IAB-N4 418. Then, the IAB node's primary link 430 with the master node may fail and, consequently, the secondary node, such as IAB-N2 414, may take over the availability indication for the IAB node (e.g., IAB-N3 416). The secondary node may transmit AI to the IAB node that is not consistent with the AI previously transmitted by the master node.

In some embodiments, an RRC connection in a multi-hop IAB system may be end-to-end, meaning that an IAB-MT's communication at an RRC layer may be subject to a cumulative multi-hop delay with an IAB donor CU. This may be in contrast to a conventional access link in which a UE's communication at the RRC layer is virtually guaranteed to have reached its destination once acknowledged at a MAC sublayer.

In various embodiments, if resource coordination for a DC mode is used in an IAB systems, a delay to perform RLF recovery may be disruptive to communication that pass through a DC IAB node. That may be particularly applicable for resource coordination (e.g., availability indication) unless lower-layer ("L1") signaling is in place that enables the IAB node to replace a master node with a secondary node for the purpose of availability indication.

In certain embodiments, dual connectivity may enhance reliability in cellular systems through diversity and load balancing. This may particularly apply in an IAB system in which a cell may serve not only UEs, but also serve other IAB nodes that relay communications with UEs. As may be appreciated, enhanced reliability through DC may facilitate better QoS by reducing connection interruptions and providing seamless connectivity in dynamic environments.

Figure 5:
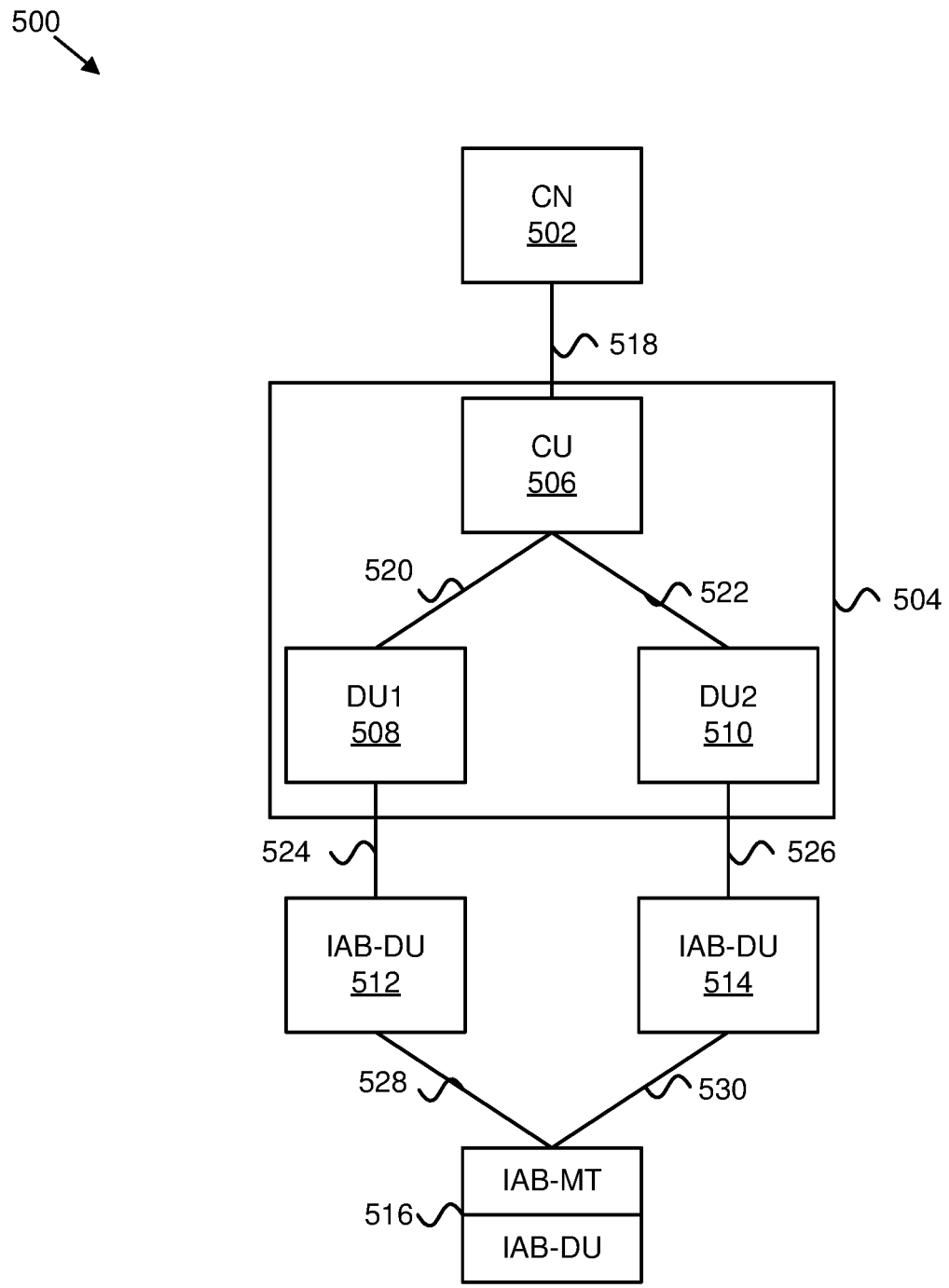
FIG. 5 is a schematic block diagram illustrating one embodiment of a system including a DC architecture for an IAB.

FIG. 5 is a schematic block diagram illustrating one embodiment of a system 500 including a DC architecture for an IAB. The system 500 includes a CN 502 and a DC architecture connected to the CN 502 via an IAB donor 504 (e.g., gNB). The IAB donor 504 includes a CU 506, a DU DU1 508, and a DU DU2 510. The system 500 also includes an IAB-DU 512 (e.g., parent node), an IAB-DU 514 (e.g., parent node), and an IAB-MT/IAB-DU 516 (e.g., child node).

The CN 502 communicates with the CU 506 via a first communication interface 518, the CU 506 communicates with the DU1 508 via a second communication interface 520, the CU 506 communicates with the DU2 510 via a third communication interface 522, the DU1 508 communicates with the IAB-DU 512 via a fourth communication interface 524, the DU2 510 communicates with the IAB-DU 514 via a fifth communication interface 526, the IAB-DU 512 communicates with the IAB-MT/IAB-DU 516 via a sixth communication interface 528 (e.g., MCG link), and the IAB-DU 514 communicates with the IAB-MT/IAB-DU 516 via a seventh communication interface 530 (e.g., SCG link). Each of the interfaces 524 and 526 may include a multi-hop route in which each hop includes a link between two network units 104 that are not shown in FIG. 5.

In the system 500 of FIG. 5, DC may only be enabled if an IAB node is served by parent node DUs that are connected to a common IAB donor CU-UP.

In various embodiments, multiplexing resources may be used in a time domain between backhaul links as well as between backhaul and access links. In some embodiments, resource configuration and multiplexing may be possible at an OFDM symbol-level granularity. In certain embodiments, a CU may be responsible for topology-wide management of semi-static time-domain resource configurations. In various embodiments, local signaling from parent IAB-DUs 512 and 514 to an IAB-MT in a child IAB node 516 via PDCCH (e.g., DCI format 2_5) may indicate availability of semi-statically configured resources to an IAB-DU in the child IAB node 516.

In some embodiments, there may be semi-static configuration of time resources by a CU to a DU that may be cell-specific. In such embodiments, each time resource in a configuration may contain one or multiple symbols with downlink, uplink, or flexible attributes as well as hard, soft, or not-available attributes.

In certain embodiments, D/U/F attributes may determine a direction of communications on configured resources. In such embodiments, flexible resources may be configured as downlink or uplink. Moreover, in such embodiments, the D/U/F pattern of a DU's time resource configuration may be aligned with the DU's transmission of TDD-UL-DL-common in SIB1 and the CU's configuration of TDD-UL-DL-dedicated and Slot-Format-Indicator for each UE and MT connected to the DU.

In various embodiments, H/S/NA attributes may be used to increase flexibility of resource allocation and scheduling in IAB systems. In such embodiments, hard resources may be available for an IAB-DU to schedule communications (e.g., downlink or uplink as determined by the D/U/F configurations) with child IAB-MTs or UEs. Moreover, in such embodiments, soft resources may be available only if they are indicated available by a DCI message (e.g., DCI format 2_5). Further, in such embodiments, NA resources may not be available for the IAB-DU for scheduling any downstream communications such as an uplink communication or a downlink communication with an IAB-MT of a child node connected to the IAB-DU.

In some embodiments, an IAB-DU may only use resources that are determined available for scheduling downstream communications with child IAB-MTs and connected UEs. In such embodiments, the IAB-DU may also inform child nodes via layer-1 signaling about which soft time resources are available. The layer-1 signaling may use a DCI format (e.g., DCI format 2_5) based on D/U/F attributes of the resources and the child IAB-DU's cell ID with parameters that are configured by the CU via RRC.

In certain embodiments, an AI may have a granularity of D/U/F type per slot and may be interpreted based on a child node's configuration, not a parent node's configuration. Therefore, in such embodiments, the parent IAB-DU may be informed by a CU about its child IAB-DUs' resource configurations.

In various embodiments, a parent IAB node/donor may be provided with a full D/U/F+H/S/NA resource configuration for each child IAB-DU. In some embodiments, a parent IAB node/donor may be provided with cell-specific signal and/or channel configurations of each child IAB-DU.

In certain embodiments, if an NA or soft resource is configured with cell-specific signals and/or channels, the resource may be treated as if it were a hard resource. In various embodiments, a list of cell-specific signals and/or channels may include: 1) resources for SSB transmission at a DU, including both CD-SSB and non-CD-SSB; 2) configured RACH occasions for receiving data at the DU; 3) periodic CSI-RS transmission at the DU; and/or 4) scheduled resources for receiving SR at the DU. In some embodiments, a parent may not need to be aware of cell-specific signals and/or channel configurations of a child DU.

In certain embodiments, a parent node may be enabled to be made aware of resource configuration information for a child node. In such embodiments, the resource configuration information at the parent node may be used for availability indication of soft resources for the child node.

In various embodiments, a parent node (e.g., either a master node or a secondary node) may be made aware of configuration information, and for DC, a secondary node may have to be made aware of the configuration information before it may transmit AI (e.g., DCI format 2_5) to a child node to avoid conflicts.

In some embodiments, a same parent node that relays configuration information to a child node receives the configuration information through the same IAB path. In such embodiments, timing for validity may not be an issue. However, with multi-hop non-ideal backhaul, a secondary node may experience a different multi-hop delay if receiving the configuration information and may need timing specification for validity of the configuration information.

In certain embodiments, both parent nodes of an IAB node have common information of their resource configurations (e.g., D/U/F and H/S/NA).

In various embodiments, only a master node may transmit AI. In such embodiments, only the master node may be enabled to indicate availability. Moreover, in such embodiments, if a primary link is disrupted (e.g., due to an RLF), an IAB node may not be able to use soft resources until a successful RLF recovery or until a new primary link is established. This may result in low resource utilization (e.g., especially for FR2 and/or mobile IAB scenarios in which RLF may be frequent). Further, in such embodiments, because a secondary node has no role in determining availability for its child node, it may have limited options for resource coordination.

In some embodiments, a secondary node of a child node may be provided with information of an AI for the child node. In such embodiments, uplink control signaling may be used so the child node relays the AI information to the secondary node. The secondary node may not have control over the AI information, but it may obtain the AI information and use the AI information for resource coordination such as scheduling communications with other child nodes or UEs.

Figure 6:
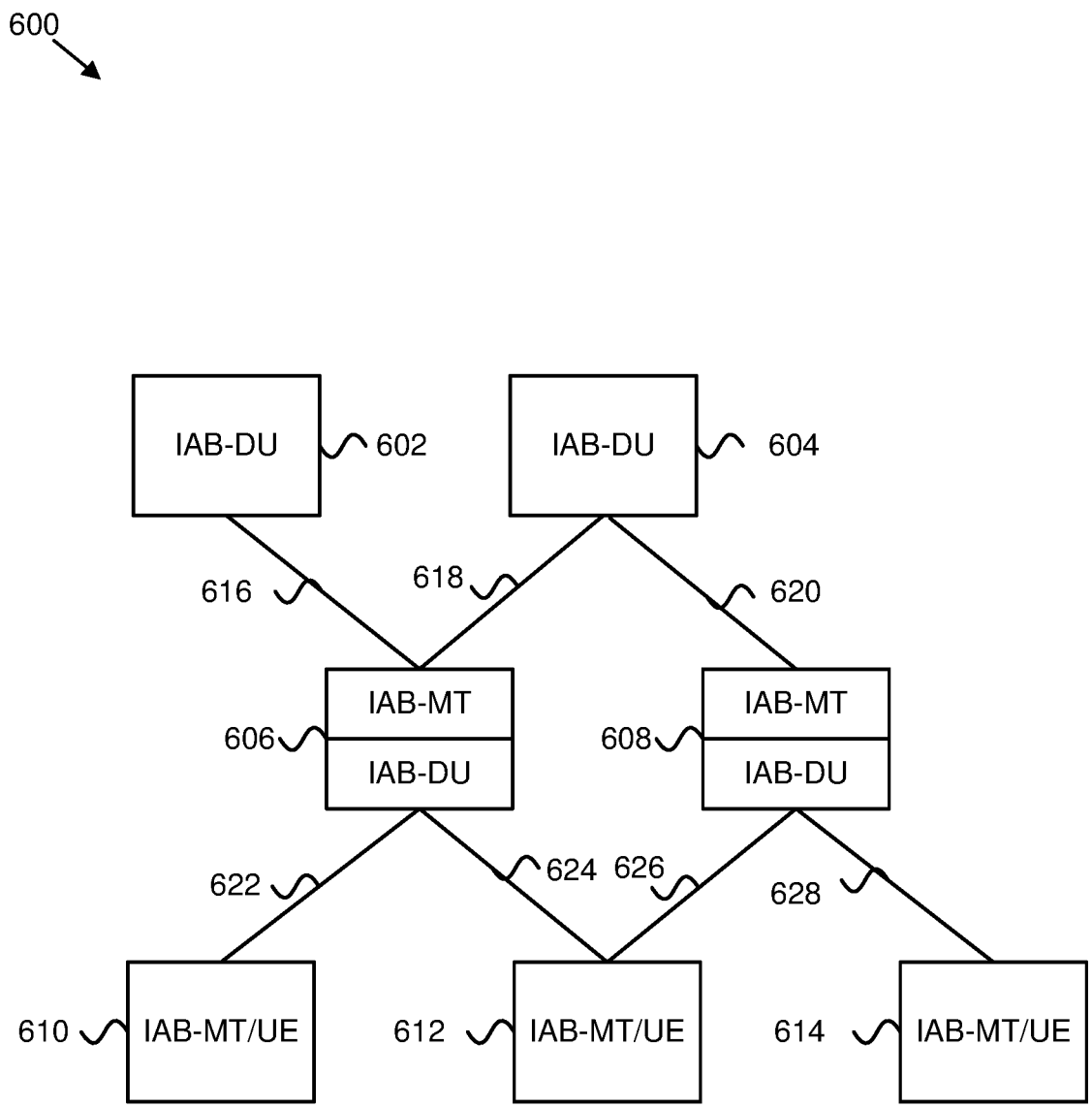
FIG. 6 is a schematic block diagram illustrating one embodiment of an IAB DC system.

FIG. 6 is a schematic block diagram illustrating one embodiment of an IAB DC system 600. The IAB DC system 600 includes a first node 602 (e.g., N1, IAB-DU), a second node 604 (e.g., N2, IAB-DU), a third node 606 (e.g., N3, IAB-MT/IAB-DU), a fourth node 608 (e.g., N4, IAB-MT/IAB-DU), a fifth node 610 (e.g., N5, IAB-MT/UE), a sixth node 612 (e.g., N6, IAB-MT/UE), and a seventh node 614 (e.g., N7, IAB-MT/UE).

The first node 602 communicates with the third node 606 via a first communication interface 616 (e.g., MCG link), the second node 604 communicates with the third node 606 via a second communication interface 618 (e.g., SCG link), the second node 604 communicates with the fourth node 608 via a third communication interface 620 (e.g., MCG link), the third node 606 communicates with the fifth node 610 via a fourth communication interface 622, the third node 606 communicates with the sixth node 612 via a fifth communication interface 624, the fourth node 608 communicates with the sixth node 612 via a sixth communication interface 626, and the fourth node 608 communicates with the seventh node 614 via a seventh communication interface 628.

In FIG. 6, the third node 606 and the fourth node 608 receive D/U/F+H/S/NA resource configurations, and the first node 602 and the second node 604 may be provided information indicating those resource configurations. The third node 606 may receive AI from the first node 602 and may relay the AI information to the second node 604. As used herein, AI may mean information conveyed via L1 signaling, while AI information may refer to the information, which may or may not be conveyed by using signaling similar to L1 signaling. Then, the second node 604 may use this AI information for transmitting other AI to the fourth node 608 in a way that avoids collision on resources that are common between the third node 606 and the fourth node 608. Then, the third node 606 and the fourth node 608 use the AI information for scheduling communications with the fifth node 610, the sixth node 612, and the seventh node 614. As may be appreciated, details about how relayed information is used by the second node 604 (e.g., for transmitting AI to the fourth node 608) and/or by the fourth node 608 (e.g., to schedule communications with the sixth node 612 and/or the seventh node 614) may be specified by a standard document, may be configured by the system such as via a CU, and/or may be left to implementation.

In some embodiments, instead of uplink control signaling from an IAB node to a secondary node, a master node and the secondary node IAB-DUs may communicate information if a backhaul (e.g., an ideal backhaul) is available.

In certain embodiments, both parent nodes may be enabled to transmit AI. In such embodiments, a child IAB node's behavior may be defined. At least two behaviors for the child node may be defined if an IAB node receives AI for overlapping resources, according to one of the following: 1) prioritize AI from a master node—AI is sent by both parent nodes and a resource is interpreted as available if indicated available by the master node and is interpreted not available if indicated not available by the master node; 2) combine the AI from the master node and a secondary node—AI is sent by both parent nodes and a resource is interpreted as available if indicated available by both the master node and the secondary node and is interpreted not available otherwise; and 3) prioritize an earliest and/or latest AI.

In some embodiments, if an AI is to be neglected by an IAB node, it may be determined that either: 1) only AI for overlapping resources are neglected; or 2) the whole AI message is neglected.

In various embodiments, if an IAB node receives multiple DCI formats indicating resource availability for a given slot, the IAB node may not expect to receive inconsistent information for availability of a resource such as different AI index fields for a given slot.

In certain embodiments, if a first received AI (e.g., first in time) at least partially overlaps with a second received AI (e.g., second in time), certain portions of the first received AI may be valid, certain portions of the first received AI may be invalid, certain portions of the second received AI may be valid, and/or certain portions of the second received AI may be invalid. For example, in one embodiment, the entire first received AI may be considered valid, and a portion of the second received AI that overlaps with the first received AI may be considered invalid (e.g., and a portion of the second received AI that does not overlap with the first received AI may be considered valid). As another example, in one embodiment, the entire second received AI may be considered valid, and a portion of the first received AI that overlaps with the second received AI may be considered invalid (e.g., and a portion of the first received AI that does not overlap with the second received AI may be considered valid).

In certain embodiments, only one parent node may transmit AI at a time. In such embodiments, a secondary node may transmit AI, but only if there is not AI from a master node. This behavior may be configured by the system such as by a CU. In some embodiments, a primary link may temporarily fail and an IAB node may have not successfully recovered the failed link or established a new primary link. In such embodiments, a secondary node may be able to be notified to be able to transmit AI to the IAB node. Moreover, in such embodiments, this may be done by UCI signaling, PUCCH control signaling, or MAC signaling. Further, in such embodiments, once the secondary node receives the signaling, it may transmit AI to the IAB node until the failed link is recovered or a new primary link is established. Then, either: 1) the IAB node transmits additional UCI signaling, PUCCH control signaling, or MAC signaling to the secondary node that notifies it that no more AI is needed (signaling from the gNB CU may inform the secondary node that an AI is not needed); or 2) the secondary node sets a timer for transmitting AI to the IAB node—this timer may be properly set to match a time needed for the IAB node to recover or establish a primary link (if the IAB node recovers or establishes a primary link before this timer expires the IAB node may simply neglect AI that overlaps with AI from the master node or inform the secondary node that the IAB node is not expecting any more AI from the secondary node).

In various embodiments, multiple embodiments described herein may be used together, and if some embodiments are not fully consistent, a CU may determine how to implement the combination of embodiments. For example, whether a secondary node may transmit AI and/or how the IAB node should interpret overlapping AI may be determined by an RRC configuration. This may be useful because different embodiments may have different behaviors. For example, in a low-load regime in which non-overlapping resources may be configured for IAB nodes in a vicinity, AI may be transmitted by both parent nodes without causing conflicts. However, in a high-traffic regime in which a higher resource utilization is desired, overlapping soft resources may be configured for several IAB nodes and their availability may be indicated by parent nodes. In this case, it may be desirable to either allow only one parent node to transmit AI at a time or to specify behaviors for interpreting overlapping AI for more than one parent node. As may be appreciated, in an IAB system with varying traffic, the above behaviors may be configured semi-statically by a CU.

In certain embodiments, a node (e.g., the third node 606) receives a configuration for MCG and SCG in masterCellGroup and secondaryCellGroup, respectively. In such embodiments, if parameters associated with monitoring DCI (e.g., DCI format 2_5) are included in the configuration for MCG, the node monitors DCI from a master node. Moreover, in such embodiments, if parameters associated with monitoring DCI are included in the configuration for SCG, the node monitors DCI from a secondary node.

In a first embodiment, parameters associated with monitoring DCI may be used to configure monitoring a PDCCH for AI.

In a second embodiment, parameters associated with monitoring DCI may be scrambled with an AI-RNTI. In such an embodiment, if an AI-RNTI field is included in an MCG configuration, a node considers that AI may be transmitted by an MN. Similarly, if an AI-RNTI field is included in an SCG configuration, a node considers that AI will be transmitted by an SN.

In some embodiments, after an available parent node receives an upper layer indication from a node, the parent node may allocate an AI-RNTI to a node and inform a CU.

In various embodiments, if an AI request and/or DCI request is used, an AI-RNTI may be configured for both an MCG and an SCG. In such embodiments, signaling for an explicit indication may be used to indicate which parent node is enabled to transmit AI. For example, a parameter setting such as the following could be used: AI-AllowedIAB-Node:=<IAB-node ID>. As another example, an IAB-node ID may be a cellgroupID (e.g., cellgroupID=0 for an MCG and cellgroupID=1 for an SCG). As a further example, the ID may be a BAP address of a parent IAB node. In embodiments described herein, a PCell may be set as a default availability indicator by specification or by a system-wide configuration.

In certain embodiments, if a node detects an RLF for a link allowed and/or determined to transmit AI, the node triggers transmission of an AI request and/or DCI request to the other link and/or parent node by signaling from layer-1, a MAC CE, and/or a BAP entity.

In some embodiments, if a parent node receives an indication to transmit an AI and/or DCI, the parent node informs a CU. Different embodiments may be used to inform the CU. In various embodiments, a CU is not immediately informed, and issues are handled locally (e.g., between an IAB node and a parent node). Such embodiments may have a faster reaction time, especially in a multi-hop IAB system.

In certain embodiments, signaling is used to permit and/or approve a change of a parent node that indicates availability of soft resources. This may facilitate higher overall reliability.

In some embodiments, a local resolution may be enabled to avoid a major interruption until permission and/or approval signaling is received by a CU. In various embodiments, a timer may be set before which a parent node handles issues temporarily until new signaling for enabling availability indication is received from a CU.

Some embodiments that are configurable are advantageous because a fragility of a system resulting in an RLF depends on resource configuration and scenarios. In certain embodiments, such as in a static system with mostly hard resource configurations, a configurable approach enables a waiting period for signaling from a CU. In various embodiments, in a mobile system with variable traffic and mostly soft resource configurations, a local temporary resolution may be beneficial.

In some embodiments, a resource configured as available (e.g., over RRC and/or F1) and/or indicated as available (e.g., by DCI such as DCI format 2_5 or another AI message) prior to an RLF may be used until a node receives new AI from a second parent node.

In certain embodiments, only resources indicated available by RRC and/or an F1 configuration (e.g., hard resources) prior to an RLF may be used. However, in such embodiments, an IAB-node stops using soft resource indicated available by DCI upon detecting an RLF.

In various embodiments, an IAB-node may refrain from scheduling any further communications, but may continue to honor previous scheduling by transmitting or receiving signals on channels, such as a PDSCH or PUSCH, that have been scheduled. In such embodiments, possible collisions and/or failures may be handled by a HARQ process and/or other mechanisms.

In some embodiments, an IAB-node may refrain from scheduling any communications on soft resources and also may cancel or decline all communications, such as a PDSCH or PUSCH, that have been scheduled on the soft resources.

In certain embodiments, (e.g., for a downlink channel such as a PDSCH already scheduled on soft resources) an IAB-DU may refrain from transmitting downlink signals to a child IAB-MT or a UE. Consequently, in such embodiments, an IAB-MT or the UE may not be able to receive and/or decode signals expected on a scheduled channel, which results in a reception failure that may be handled by a HARQ process and/or other methods. Furthermore, in such embodiments, if a channel is scheduled on a combination of hard and soft resources, the IAB node refrains from transmitting any signal on either hard or soft resources.

In various embodiments, (e.g., for an uplink channel such as a PUSCH already scheduled on soft resources) an IAB-DU may enable uplink communication to occur and may receive signals from a child IAB-MT. In some embodiments, an IAB-DU may use signaling to cancel uplink communications. Such embodiments may be performed, for example, by an inactivity timer that may expire due to a lack of signaling from an IAB node to a child IAB-MT, which then informs the IAB-MT that it may refrain from transmitting signals on an uplink channel.

In some embodiments, whether to honor, cancel, and/or decline a scheduled communication may be determined based on a priority or a significance of the communication. In one example, scheduling a control channel, such as a PDCCH or PUCCH, may be honored and scheduling a shared channel, such as a PDSCH or PUSCH, may be canceled and/or declined. In another example, communication of a transport block with a high QoS priority indicated by a QCI or a transport block with data of a high priority logical channel may be honored and communication of a low QoS priority or low logical channel priority may be canceled and/or declined. As may be appreciated, a priority threshold may be used to determine whether a transmission of a transport block is canceled and/or declined. In one example, a downlink communication may be canceled and/or declined and an uplink communication may be honored. Various combinations of the above may be part of certain embodiments. In some embodiments, a CU may configure whether to honor, cancel, and/or decline a scheduled communication based on a priority or a significance of a communication.

In some embodiments, resources configured as hard may be used as usual, but resources configured as soft and indicated available by a parent node may only be used until a timer expires. In such embodiments, the timer may be configured by a CU, may start running once an AI is received from a parent node, may start once an RLF is detected, and so forth. Moreover, in such embodiments, a length of the timer may be determined by a configuration or a specification. Further, in such embodiments, resources that are indicated available may be used to schedule downstream communications until the timer expires. In certain embodiments, if an AI message indicates availability for resources that occur before and after a timer expires, the whole message may be determined to be invalid (e.g., none of the soft resources indicated available by the AI message may be used). In some embodiments, if an AI message indicates availability for resources that occur before and after a timer expires, the resources that occur before the timer expires may be used (e.g., valid), but the resources that occur after the timer expires may not be used (e.g., invalid). Various behavior relating to message validity in relation to a timer may be configured by a CU.

In certain embodiments, an IAB node that receives AI from a parent node may experience an RLF that may result in a temporary resource starvation until the link is reestablished. Meanwhile, in such embodiments, the IAB node may be enabled to request AI signaling from another parent node. For example, a MAC CE may be sent to the other parent node for a DCI request or an AI request. The MAC CE may be identified by a MAC sub-header with an LCID. Moreover, the MAC CE may have a fixed size of zero bits, or the link (e.g., cell) index may be added in the MAC CE.

Figure 7:
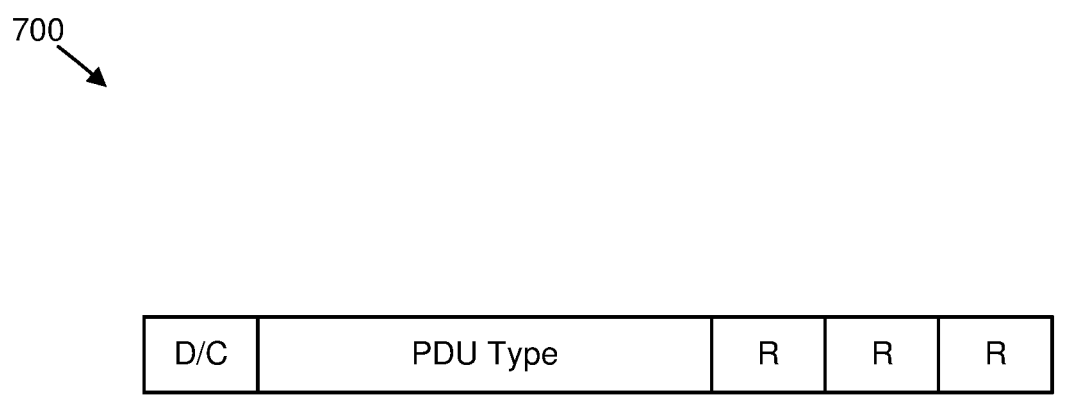

FIG. 7 is a schematic block diagram illustrating one embodiment of a BAP control PDU format 700. The BAP control PDU format 700 includes a data or control ("D/C") bit, a PDU type set of bits (e.g., four bits), and three separate reserved ("R") bits.

Some embodiments may reuse the BAP control PDU format 700 in order to transmit an AI request and/or a DCI request. In such embodiments, if a parent IAB node (e.g., the second node 604) receives an AI request and/or a DCI request from a child IAB node (e.g., the third node 606), the parent IAB node may be enabled to transmit an availability indication (e.g., through a DCI message). Further, in such embodiments, a new PDU type may be used to signal the AI request.

Various embodiments may use a reserved bit of the BAP control PDU format 700. In such embodiments, one of the three reserved bits of the BAP control PDU format 700 may be used. For example, if a specific one of the three bits may be set to a "1" to indicate this is an AI request and/or DCI request.

Figure 8:
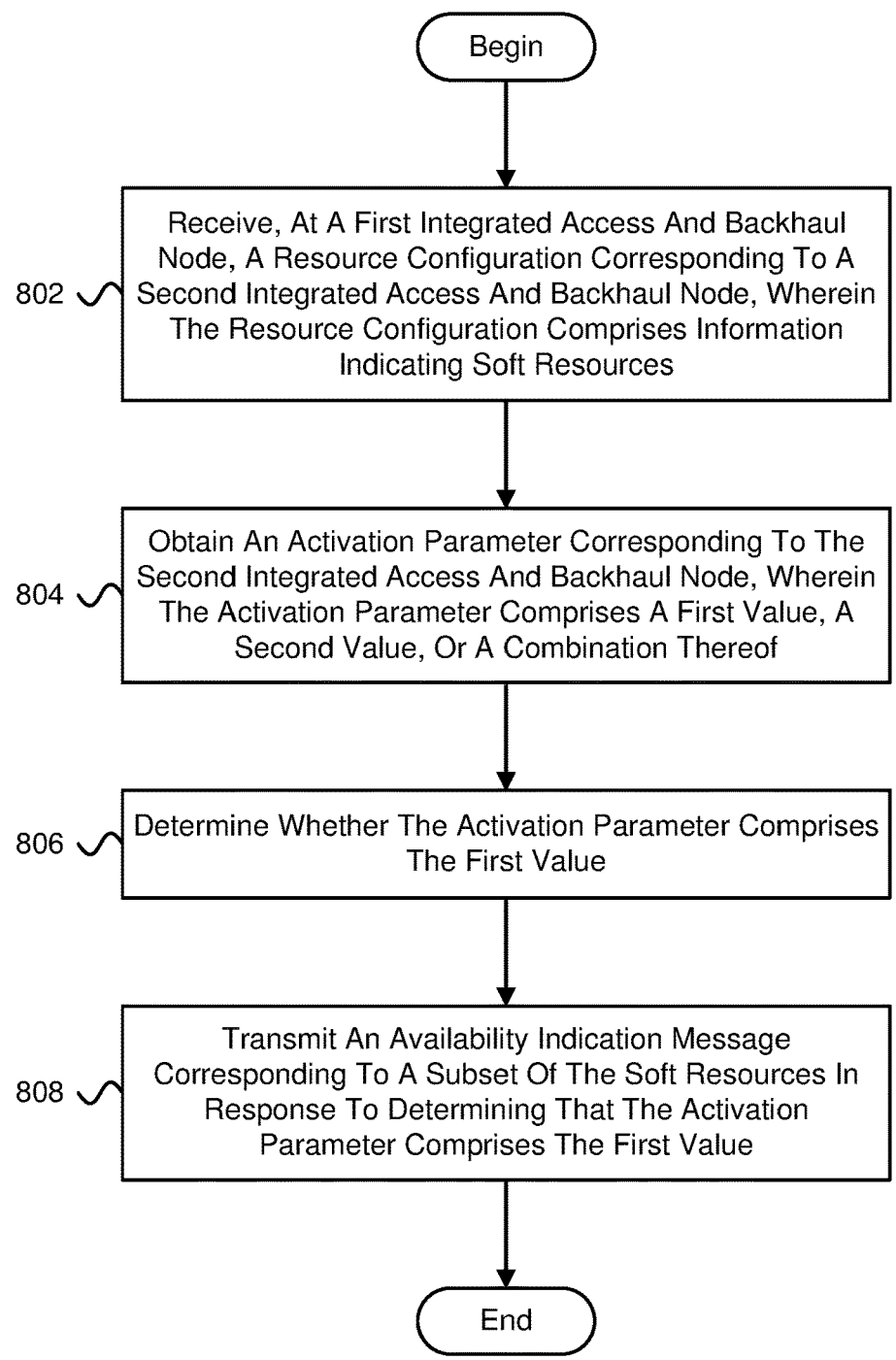
FIG. 8 is a schematic flow chart diagram illustrating one embodiment of a method for integrated access and backhaul node configuration.

FIG. 8 is a schematic flow chart diagram illustrating one embodiment of a method 800 for integrated access and backhaul node configuration. In some embodiments, the method 800 is performed by an apparatus, such as the remote unit 102 and/or the network unit 104. In certain embodiments, the method 800 may be performed by a processor executing program code, for example, a microcontroller, a microprocessor, a CPU, a GPU, an auxiliary processing unit, a FPGA, or the like.

The method 800 may include receiving 802, at a first integrated access and backhaul node, a resource configuration corresponding to a second integrated access and backhaul node, wherein the resource configuration comprises information indicating soft resources. In certain embodiments, the method 800 includes obtaining 804 an activation parameter corresponding to the second integrated access and backhaul node, wherein the activation parameter comprises a first value, a second value, or a combination thereof. In some embodiments, the method 800 includes determining 806 whether the activation parameter comprises the first value. In various embodiments, the method 800 includes transmitting 808 an availability indication message corresponding to a subset of the soft resources in response to determining that the activation parameter comprises the first value.

In certain embodiments, the first integrated access and backhaul node provides a serving cell to the second integrated access and backhaul node. In some embodiments, obtaining the activation parameter comprises receiving the activation parameter from an integrated access and backhaul donor (e.g., an integrated access and backhaul donor central unit). In various embodiments, the first integrated access and backhaul node is a secondary node of the second integrated access and backhaul node, and obtaining the activation parameter comprises receiving an availability indication request associated with a link between the second integrated access and backhaul node and a master node of the second integrated access and backhaul node.

In one embodiment, the first integrated access and backhaul node is a secondary node of the second integrated access and backhaul node, and obtaining the activation parameter comprises receiving an indication of a radio link failure associated with a link between the second integrated access and backhaul node and a master node of the second integrated access and backhaul node. In certain embodiments, obtaining of the activation parameter comprises receiving a request message from the second integrated access and backhaul node. In some embodiments, the first value is a 1, an active indication, a true indication, or an allowed indication, and the second value is a 0, an inactive indication, a false indication, or a not allowed indication.

Figure 9:
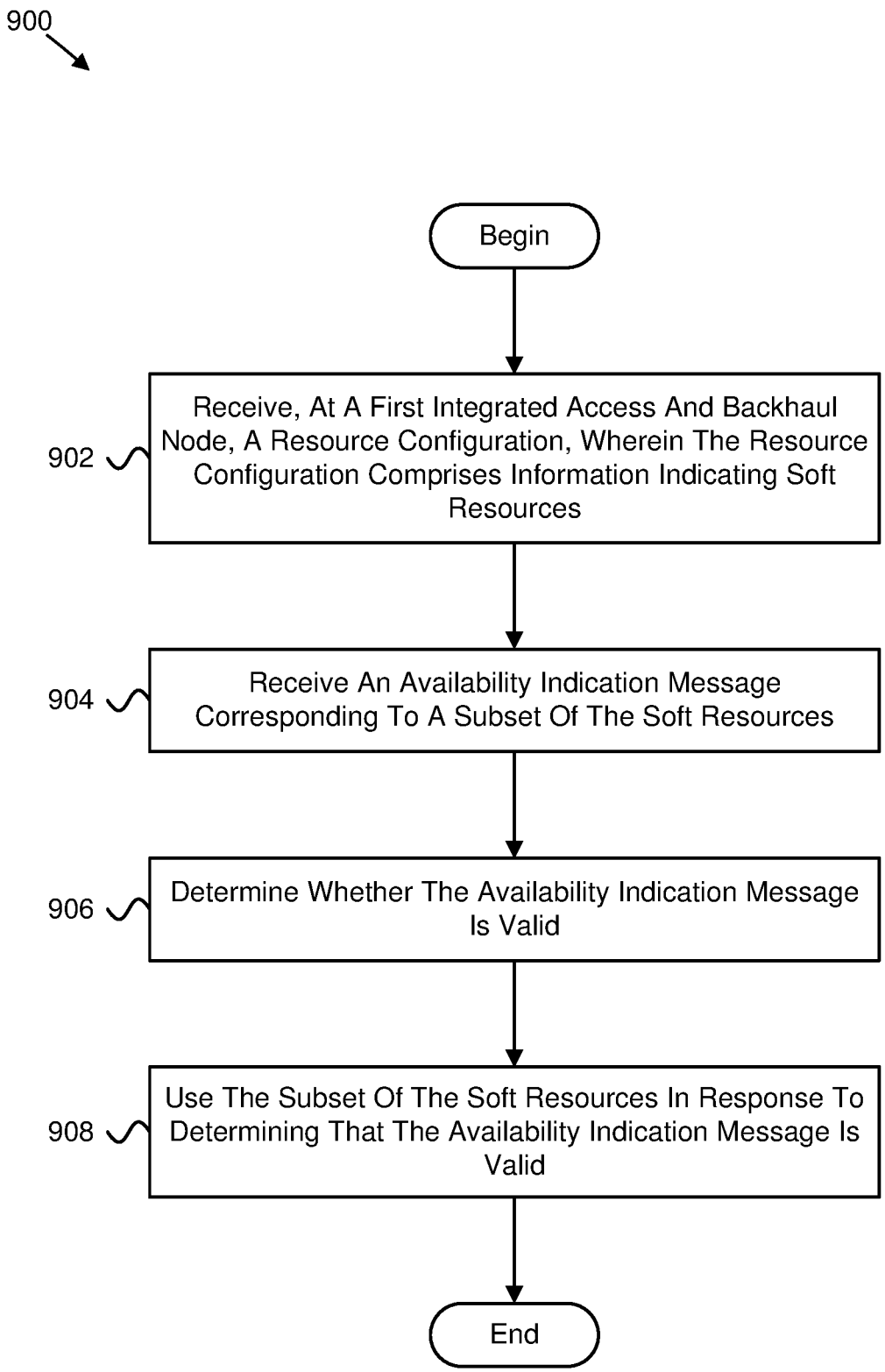
FIG. 9 is a schematic flow chart diagram illustrating another embodiment of a method for integrated access and backhaul node configuration.

FIG. 9 is a schematic flow chart diagram illustrating another embodiment of a method 900 for integrated access and backhaul node configuration. In some embodiments, the method 900 is performed by an apparatus, such as the remote unit 102 and/or the network unit 104. In certain embodiments, the method 900 may be performed by a processor executing program code, for example, a microcontroller, a microprocessor, a CPU, a GPU, an auxiliary processing unit, a FPGA, or the like.

The method 900 may include receiving 902, at a first integrated access and backhaul node, a resource configuration, wherein the resource configuration comprises information indicating soft resources. In certain embodiments, the method 900 includes receiving 904 an availability indication message corresponding to a subset of the soft resources. In some embodiments, the method 900 includes determining 906 whether the availability indication message is valid. In various embodiments, the method 900 includes using 908 the subset of the soft resources in response to determining that the availability indication message is valid.

In certain embodiments, determining whether the availability indication message is valid comprises determining whether the availability indication message is valid based on a configuration. In some embodiments, determining whether the availability indication message is valid comprises determining whether the availability indication message is valid based on a radio link failure. In various embodiments, the availability indication message is received from a secondary node of the first integrated access and backhaul node, and the radio link failure is associated with a link between the first integrated access and backhaul node and a secondary node of the first integrated access and backhaul node.

In one embodiment, determining whether the availability indication message is valid comprises determining whether a difference between a first time corresponding to receiving the availability indication message and a second time corresponding to the subset of the soft resources is not larger than a threshold. In certain embodiments, the threshold is determined based on an expiration of a timer. In some embodiments, the timer is configured by an integrated access and backhaul donor.

In various embodiments, the threshold is obtained by a configuration. In one embodiment, the threshold is a number of slots. In certain embodiments, the threshold is a number of symbols.

In some embodiments, the threshold for determining validity of an AI message for soft resources is determined based on a subcarrier spacing. In some embodiments, the threshold is reported by an IAB node as a node capability. In various embodiments, a node capability is reported as a number of slots or a number of symbols for one or multiple values of subcarrier spacing. Then, in such embodiments, the threshold is determined as the number of slots or the number of symbols associated with a subcarrier spacing that is associated with an active BWP (e.g., the BWP on which the soft resources are configured). In various embodiments, the threshold is determined based on the availability indication message.

Figure 10:
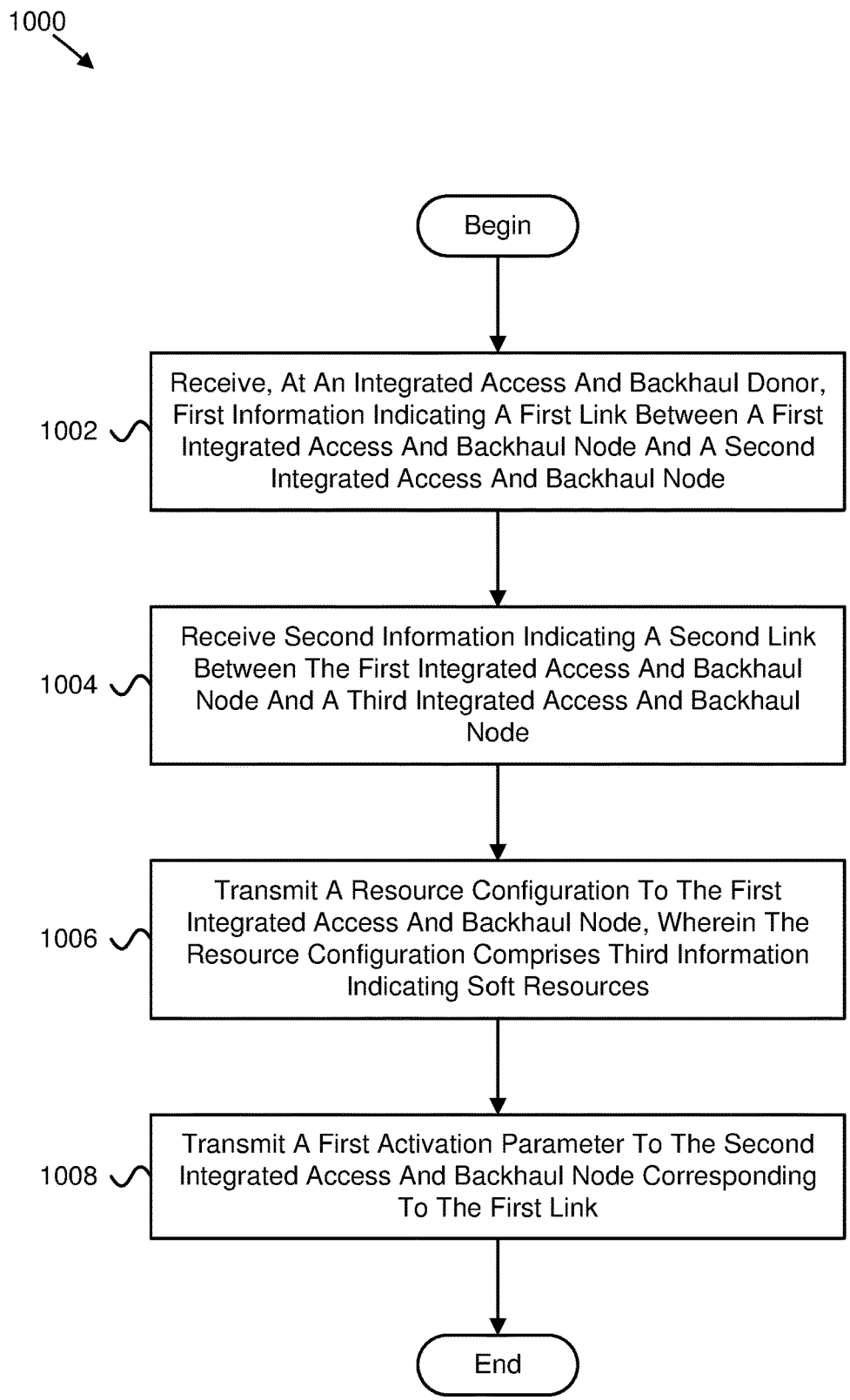
FIG. 10 is a schematic flow chart diagram illustrating a further embodiment of a method for integrated access and backhaul node configuration.

FIG. 10 is a schematic flow chart diagram illustrating a further embodiment of a method 1000 for integrated access and backhaul node configuration. In some embodiments, the method 1000 is performed by an apparatus, such as the remote unit 102 and/or the network unit 104. In certain embodiments, the method 1000 may be performed by a processor executing program code, for example, a microcontroller, a microprocessor, a CPU, a GPU, an auxiliary processing unit, a FPGA, or the like.

The method 1000 may include receiving 1002, at an integrated access and backhaul donor (e.g., central unit of an integrated access and backhaul donor), first information indicating a first link between a first integrated access and backhaul node and a second integrated access and backhaul node. In certain embodiments, the method 1000 includes receiving 1004 second information indicating a second link between the first integrated access and backhaul node and a third integrated access and backhaul node. In some embodiments, the method 1000 includes transmitting 1006 a resource configuration to the first integrated access and backhaul node, wherein the resource configuration comprises third information indicating soft resources. In various embodiments, the method 1000 includes transmitting 1008 a first activation parameter to the second integrated access and backhaul node corresponding to the first link.

In certain embodiments, the first activation parameter is a 1, an active indication, a true indication, or an allowed indication. In some embodiments, the method 1000 further comprises: receiving fourth information indicating a radio link failure corresponding to the first link; and transmitting a second activation parameter to the third integrated access and backhaul node corresponding to the second link. In various embodiments, the second activation parameter takes is a 1, an active indication, a true indication, or an allowed indication.

In one embodiment, the method 1000 further comprises transmitting a third activation parameter to the third integrated access and backhaul node corresponding to the first link. In certain embodiments, the third activation parameter is a 0, an inactive indication, a false indication, or a not allowed indication. In some embodiments, the method 1000 further comprises transmitting fifth information of a threshold, wherein the threshold is associated with a validity of an availability indication message. In various embodiments, the availability indication message is associated with the soft resources.

In one embodiment, a method comprises: receiving, at a first integrated access and backhaul node, a resource configuration corresponding to a second integrated access and backhaul node, wherein the resource configuration comprises information indicating soft resources; obtaining an activation parameter corresponding to the second integrated access and backhaul node, wherein the activation parameter comprises a first value, a second value, or a combination thereof; determining whether the activation parameter comprises the first value; and transmitting an availability indication request message corresponding to a subset of the soft resources in response to determining that the activation parameter comprises the first value.

In certain embodiments, the first integrated access and backhaul node provides a serving cell to the second integrated access and backhaul node.

In some embodiments, obtaining the activation parameter comprises receiving the activation parameter from an integrated access and backhaul donor (e.g., an integrated access and backhaul donor central unit).

In various embodiments, the first integrated access and backhaul node is a secondary node of the second integrated access and backhaul node, and obtaining the activation parameter comprises receiving an availability indication request associated with a link between the second integrated access and backhaul node and a master node of the second integrated access and backhaul node.

In one embodiment, the first integrated access and backhaul node is a secondary node of the second integrated access and backhaul node, and obtaining the activation parameter comprises receiving an indication of a radio link failure associated with a link between the second integrated access and backhaul node and a master node of the second integrated access and backhaul node.

In certain embodiments, obtaining of the activation parameter comprises receiving a request message from the second integrated access and backhaul node.

In some embodiments, the first value is a 1, an active indication, a true indication, or an allowed indication, and the second value is a 0, an inactive indication, a false indication, or a not allowed indication.

In one embodiment, an apparatus comprises: a receiver that receives, at a first integrated access and backhaul node, a resource configuration corresponding to a second integrated access and backhaul node, wherein the resource configuration comprises information indicating soft resources; a processor that: obtains an activation parameter corresponding to the second integrated access and backhaul node, wherein the activation parameter comprises a first value, a second value, or a combination thereof; and determines whether the activation parameter comprises the first value; and a transmitter that transmits an availability indication message corresponding to a subset of the soft resources in response to determining that the activation parameter comprises the first value.

In certain embodiments, the first integrated access and backhaul node provides a serving cell to the second integrated access and backhaul node.

In some embodiments, the processor obtaining the activation parameter comprises the receiver receiving the activation parameter from an integrated access and backhaul donor (e.g., an integrated access and backhaul donor central unit).

In various embodiments, the first integrated access and backhaul node is a secondary node of the second integrated access and backhaul node, and the processor obtaining the activation parameter comprises the receiver receiving an availability indication request associated with a link between the second integrated access and backhaul node and a master node of the second integrated access and backhaul node.

In one embodiment, the first integrated access and backhaul node is a secondary node of the second integrated access and backhaul node, and the processor obtaining the activation parameter comprises the receiver receiving an indication of a radio link failure associated with a link between the second integrated access and backhaul node and a master node of the second integrated access and backhaul node.

In certain embodiments, the processor obtaining of the activation parameter comprises the receiver receiving a request message from the second integrated access and backhaul node.

In some embodiments, the first value is a 1, an active indication, a true indication, or an allowed indication, and the second value is a 0, an inactive indication, a false indication, or a not allowed indication.

In one embodiment, a method comprises: receiving, at a first integrated access and backhaul node, a resource configuration, wherein the resource configuration comprises information indicating soft resources; receiving an availability indication message corresponding to a subset of the soft resources; determining whether the availability indication message is valid; and using the subset of the soft resources in response to determining that the availability indication message is valid.

In certain embodiments, determining whether the availability indication message is valid comprises determining whether the availability indication message is valid based on a configuration.

In some embodiments, determining whether the availability indication message is valid comprises determining whether the availability indication message is valid based on a radio link failure.

In various embodiments, the availability indication message is received from a secondary node of the first integrated access and backhaul node, and the radio link failure is associated with a link between the first integrated access and backhaul node and a secondary node of the first integrated access and backhaul node.

In one embodiment, determining whether the availability indication message is valid comprises determining whether a difference between a first time corresponding to receiving the availability indication message and a second time corresponding to the subset of the soft resources is not larger than a threshold.

In certain embodiments, the threshold is determined based on an expiration of a timer.

In some embodiments, the timer is configured by an integrated access and backhaul donor.

In various embodiments, the threshold is obtained by a configuration.

In one embodiment, the threshold is a number of slots.

In certain embodiments, the threshold is a number of symbols.

In some embodiments, the threshold is determined based on a subcarrier spacing.

In various embodiments, the threshold is determined based on the availability indication message.

In one embodiment, an apparatus comprises: a receiver that: receives, at a first integrated access and backhaul node, a resource configuration, wherein the resource configuration comprises information indicating soft resources; and receives an availability indication message corresponding to a subset of the soft resources; and a processor that: determines whether the availability indication message is valid; and uses the subset of the soft resources in response to determining that the availability indication message is valid.

In certain embodiments, the processor determining whether the availability indication message is valid comprises the processor determining whether the availability indication message is valid based on a configuration.

In some embodiments, the processor determining whether the availability indication message is valid comprises the processor determining whether the availability indication message is valid based on a radio link failure.

In various embodiments, the availability indication message is received from a secondary node of the first integrated access and backhaul node, and the radio link failure is associated with a link between the first integrated access and backhaul node and a secondary node of the first integrated access and backhaul node.

In one embodiment, the processor determining whether the availability indication message is valid comprises the processor determining whether a difference between a first time corresponding to receiving the availability indication message and a second time corresponding to the subset of the soft resources is not larger than a threshold.

In certain embodiments, the threshold is determined based on an expiration of a timer.

In some embodiments, the timer is configured by an integrated access and backhaul donor.

In various embodiments, the threshold is obtained by a configuration.

In one embodiment, the threshold is a number of slots.

In certain embodiments, the threshold is a number of symbols.

In some embodiments, the threshold is determined based on a subcarrier spacing.

In various embodiments, the threshold is determined based on the availability indication message.

In one embodiment, a method comprises: receiving, at an integrated access and backhaul donor (e.g., a central unit of an integrated access and backhaul donor), first information indicating a first link between a first integrated access and backhaul node and a second integrated access and backhaul node; receiving second information indicating a second link between the first integrated access and backhaul node and a third integrated access and backhaul node; transmitting a resource configuration to the first integrated access and backhaul node, wherein the resource configuration comprises third information indicating soft resources; and transmitting a first activation parameter to the second integrated access and backhaul node corresponding to the first link.

In certain embodiments, the first activation parameter is a 1, an active indication, a true indication, or an allowed indication.

In some embodiments, the method further comprises: receiving fourth information indicating a radio link failure corresponding to the first link; and transmitting a second activation parameter to the third integrated access and backhaul node corresponding to the second link.

In various embodiments, the second activation parameter takes is a 1, an active indication, a true indication, or an allowed indication.

In one embodiment, the method further comprises transmitting a third activation parameter to the third integrated access and backhaul node corresponding to the first link.

In certain embodiments, the third activation parameter is a 0, an inactive indication, a false indication, or a not allowed indication.

In some embodiments, the method further comprises transmitting fifth information of a threshold, wherein the threshold is associated with a validity of an availability indication message.

In various embodiments, the availability indication message is associated with the soft resources.

In one embodiment, an apparatus comprises: a receiver that: receives, at an integrated access and backhaul donor (e.g., a central unit of an integrated access and backhaul donor), first information indicating a first link between a first integrated access and backhaul node and a second integrated access and backhaul node; and receives second information indicating a second link between the first integrated access and backhaul node and a third integrated access and backhaul node; and a transmitter that: transmits a resource configuration to the first integrated access and backhaul node, wherein the resource configuration comprises third information indicating soft resources; and transmits a first activation parameter to the second integrated access and backhaul node corresponding to the first link.

In certain embodiments, the first activation parameter is a 1, an active indication, a true indication, or an allowed indication.

In some embodiments: the receiver receives fourth information indicating a radio link failure corresponding to the first link; and the transmitter transmits a second activation parameter to the third integrated access and backhaul node corresponding to the second link.

In various embodiments, the second activation parameter takes is a 1, an active indication, a true indication, or an allowed indication.

In one embodiment, the transmitter transmits a third activation parameter to the third integrated access and backhaul node corresponding to the first link.

In certain embodiments, the third activation parameter is a 0, an inactive indication, a false indication, or a not allowed indication.

In some embodiments, the transmitter transmits fifth information of a threshold, wherein the threshold is associated with a validity of an availability indication message.

In various embodiments, the availability indication message is associated with the soft resources.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus for performing a network function, the apparatus comprising:
at least one memory; and
at least one processor coupled with the at least one memory and configured to cause the apparatus to:
receive, at a first integrated access and backhaul node, a resource configuration corresponding to a second integrated access and backhaul node, wherein the resource configuration comprises information indicating soft resources;
obtain an activation parameter corresponding to the second integrated access and backhaul node, wherein the activation parameter comprises a first value, a second value, or a combination thereof, and wherein obtaining the activation parameter comprises receiving an indication of a radio link failure associated with a link between the second integrated access and backhaul node and a master node of the second integrated access and backhaul node; and
determine whether the activation parameter comprises the first value; and
transmit an availability indication message corresponding to a subset of the soft resources in response to determining that the activation parameter comprises the first value,
wherein the first integrated access and backhaul node is a secondary node of the second integrated access and backhaul node.

2. The apparatus of claim 1, wherein the at least one processor is configured to cause the apparatus to receive the activation parameter from an integrated access and backhaul donor.

3. The apparatus of claim 1, wherein the first integrated access and backhaul node is a secondary node of the second integrated access and backhaul node, and the at least one processor is configured to cause the apparatus to receive an availability indication request associated with a link between the second integrated access and backhaul node and a master node of the second integrated access and backhaul node.

4. The apparatus of claim 1, wherein the at least one processor is configured to cause the apparatus to receive a request message from the second integrated access and backhaul node.

5. An apparatus for performing a network function, the apparatus comprising:
at least one memory; and
at least one processor coupled with the at least one memory and configured to cause the apparatus to:
receive, at a first integrated access and backhaul node, a resource configuration, wherein the resource configuration comprises information indicating soft resources;
receive an availability indication message corresponding to a subset of the soft resources;
determine whether the availability indication message is valid based on a radio link failure; and
use the subset of the soft resources in response to determining that the availability indication message is valid.

6. The apparatus of claim 5, wherein the at least one processor is configured to cause the apparatus to determine whether the availability indication message is valid based on a configuration.

7. The apparatus of claim 5, wherein the availability indication message is received from a secondary node of the first integrated access and backhaul node, and the radio link failure is associated with a link between the first integrated access and backhaul node and a master node of the first integrated access and backhaul node.

8. The apparatus of claim 5, wherein the at least one processor is configured to cause the apparatus to determine whether a difference between a first time corresponding to receiving the availability indication message and a second time corresponding to the subset of the soft resources is not larger than a threshold.

9. The apparatus of claim 8, wherein the threshold is determined based on an expiration of a timer, obtained by a configuration, determined based on a subcarrier spacing, or some combination thereof, and the timer is configured by an integrated access and backhaul donor.

10. An apparatus for performing a network function, the apparatus comprising:
at least one memory; and
at least one processor coupled with the at least one memory and configured to cause the apparatus to:
receive, at an integrated access and backhaul donor, first information indicating a first link between a first integrated access and backhaul node and a second integrated access and backhaul node;
receive second information indicating a second link between the first integrated access and backhaul node and a third integrated access and backhaul node;
transmit a resource configuration to the first integrated access and backhaul node, wherein the resource configuration comprises third information indicating soft resources;
transmit a first activation parameter to the second integrated access and backhaul node corresponding to the first link;
receive fourth information indicating a radio link failure corresponding to the first link; and
transmit a second activation parameter to the third integrated access and backhaul node corresponding to the second link.

11. The apparatus of claim 10, wherein the at least one processor is configured to cause the apparatus to transmit a third activation parameter to the third integrated access and backhaul node corresponding to the first link.

12. The apparatus of claim 10, wherein the at least one processor is configured to cause the apparatus to transmit fifth information of a threshold, wherein the threshold is associated with a validity of an availability indication message.

13. The apparatus of claim 12, wherein the availability indication message is associated with the soft resources.

* * * * *